United States Patent
Popham et al.

(10) Patent No.: US 7,939,051 B2
(45) Date of Patent: May 10, 2011

(54) HYDROGEN-PRODUCING FUEL PROCESSING ASSEMBLIES, HEATING ASSEMBLIES, AND METHODS OF OPERATING THE SAME

(75) Inventors: Vernon Wade Popham, Bend, OR (US); Curtiss Renn, Bend, OR (US); Mesa Scharf, Redmond, OR (US); Kyle Taylor, Bend, OR (US)

(73) Assignee: Idatech, LLC, Bend, OR (US)

( * ) Notice: Subject to any disclaimer, the term of this patent is extended or adjusted under 35 U.S.C. 154(b) by 972 days.

(21) Appl. No.: 11/751,417

(22) Filed: May 21, 2007

(65) Prior Publication Data

US 2007/0274904 A1    Nov. 29, 2007

Related U.S. Application Data

(60) Provisional application No. 60/802,995, filed on May 23, 2006.

(51) Int. Cl.
    *C01B 3/26* (2006.01)
(52) U.S. Cl. .......................... 423/652; 423/653; 423/654
(58) Field of Classification Search .................. 423/652, 423/653, 654
    See application file for complete search history.

(56) References Cited

U.S. PATENT DOCUMENTS

| | | |
|---|---|---|
| 1,306,221 A | 6/1919 | Ellis |
| 1,782,824 A | 11/1930 | Hechenbleikner |
| 1,848,466 A | 3/1932 | Edmonds |
| 2,132,151 A | 10/1938 | Fenske et al. |
| 2,450,804 A | 10/1948 | Loy |
| 2,609,059 A | 9/1952 | Benedict |
| 2,824,620 A | 2/1958 | De Rosset |
| 3,094,391 A | 6/1963 | Mader |
| 3,144,312 A | 8/1964 | Mertens |
| 3,208,198 A | 9/1965 | Rubin |

(Continued)

FOREIGN PATENT DOCUMENTS

CA    1169753    6/1984

(Continued)

OTHER PUBLICATIONS

English-language abstract of Japanese Patent No. 57-145276, 1982.

(Continued)

*Primary Examiner* — Jessica L Ward
*Assistant Examiner* — Paul A Wartalowicz
(74) *Attorney, Agent, or Firm* — Dascenzo Intellectual Property Law, P.C.

(57) ABSTRACT

Hydrogen-producing fuel processing assemblies, including steam reforming fuel processing assemblies, startup assemblies for use therein, and methods of operating the same. In some embodiments, the startup assemblies include a startup reforming region that is upstream from a primary, or second, hydrogen-producing reforming region. In some embodiments, the startup reforming region and primary reforming regions are both steam reforming regions. In some embodiments, the startup assembly further includes at least one of a vaporization region and a startup heating assembly. In some embodiments, the startup heating assembly is an electrically powered heating assembly, and the fuel processing assembly further includes a (primary) heating assembly that combusts a byproduct stream from the fuel processing assembly to produce a combustion exhaust stream. In some embodiments, the startup reforming region is adapted to produce a gaseous output stream that will remain a gas-phase stream even if cooled below a minimum hydrogen-producing temperature.

24 Claims, 6 Drawing Sheets

U.S. PATENT DOCUMENTS

| | | |
|---|---|---|
| 3,336,730 A | 8/1967 | McBride et al. |
| 3,338,681 A | 8/1967 | Kordesch |
| 3,344,586 A | 10/1967 | Langley et al. |
| 3,350,176 A | 10/1967 | Green et al. |
| 3,356,538 A | 12/1967 | Miekka et al. |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,522,019 A | 7/1970 | Buswell et al. |
| 3,524,819 A | 8/1970 | Guerrieri |
| 3,534,531 A | 10/1970 | Eguchi et al. |
| 3,564,819 A | 2/1971 | Neulander et al. |
| 3,589,171 A | 6/1971 | Haley |
| 3,655,448 A | 4/1972 | Setzer |
| 3,665,680 A | 5/1972 | Heuser |
| 3,713,270 A | 1/1973 | Farr et al. |
| 3,761,382 A | 9/1973 | Hammond et al. |
| 3,782,904 A | 1/1974 | Fletcher |
| 3,787,038 A | 1/1974 | Tesner et al. |
| 3,791,106 A | 2/1974 | Haley |
| 3,837,146 A | 9/1974 | Faure et al. |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,920,416 A | 11/1975 | Houseman |
| 3,955,941 A | 5/1976 | Houseman et al. |
| 3,972,695 A | 8/1976 | Buckley et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,056,373 A | 11/1977 | Rubin |
| 4,071,330 A | 1/1978 | Sederquist |
| 4,078,985 A | 3/1978 | Takeuchi |
| 4,084,934 A | 4/1978 | Kumazawa |
| 4,098,587 A | 7/1978 | Krar et al. |
| 4,098,588 A | 7/1978 | Buswell et al. |
| 4,098,589 A | 7/1978 | Buswell et al. |
| 4,098,959 A | 7/1978 | Fanciullo |
| 4,098,960 A | 7/1978 | Gagnon |
| 4,112,876 A | 9/1978 | Mentschel |
| 4,113,445 A | 9/1978 | Gettert et al. |
| 4,127,393 A | 11/1978 | Timmins et al. |
| 4,132,668 A | 1/1979 | Gryaznov et al. |
| 4,134,739 A | 1/1979 | Gulden et al. |
| 4,175,165 A | 11/1979 | Adlhart |
| 4,197,152 A | 4/1980 | Palty et al. |
| 4,203,950 A | 5/1980 | Sederquist |
| 4,214,969 A | 7/1980 | Lawrance |
| 4,238,403 A | 12/1980 | Pinto |
| 4,243,536 A | 1/1981 | Prölss |
| 4,248,688 A | 2/1981 | Gartner et al. |
| 4,254,086 A | 3/1981 | Sanders |
| 4,292,274 A | 9/1981 | Faitani et al. |
| 4,302,177 A | 11/1981 | Fankhanel et al. |
| 4,313,013 A | 1/1982 | Harris |
| 4,315,893 A | 2/1982 | McCallister |
| 4,319,923 A | 3/1982 | Falanga et al. |
| 4,329,157 A | 5/1982 | Dobo et al. |
| 4,331,520 A | 5/1982 | Juda et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,417,905 A | 11/1983 | Banks et al. |
| 4,422,911 A | 12/1983 | Juda et al. |
| 4,430,304 A | 2/1984 | Spurrier et al. |
| 4,444,158 A | 4/1984 | Yoon |
| 4,466,253 A | 8/1984 | Jaster |
| 4,468,235 A | 8/1984 | Hill |
| 4,472,176 A | 9/1984 | Rubin |
| 4,473,622 A | 9/1984 | Chludzinski et al. |
| 4,504,447 A | 3/1985 | Spurrier et al. |
| 4,509,915 A | 4/1985 | Ito |
| 4,520,764 A | 6/1985 | Ozawa et al. |
| 4,533,607 A | 8/1985 | Sederquist |
| 4,553,981 A | 11/1985 | Fuderer |
| 4,567,857 A | 2/1986 | Houseman et al. |
| 4,589,891 A | 5/1986 | Iniotakis et al. |
| 4,613,436 A | 9/1986 | Wight et al. |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,655,797 A | 4/1987 | Iniotakis et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,692,306 A | 9/1987 | Minet |
| 4,693,945 A | 9/1987 | Ohyauchi et al. |
| 4,699,637 A | 10/1987 | Iniotakis et al. |
| 4,711,930 A | 12/1987 | Hoelderich et al. |
| 4,713,234 A | 12/1987 | Weirich et al. |
| 4,714,593 A | 12/1987 | Naito et al. |
| 4,717,332 A | 1/1988 | Edens |
| 4,729,931 A | 3/1988 | Grimble |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,820,594 A | 4/1989 | Sugita et al. |
| 4,838,897 A | 6/1989 | Amano et al. |
| 4,849,187 A | 7/1989 | Uozu et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,909,808 A | 3/1990 | Voecks |
| 4,946,667 A | 8/1990 | Beshty |
| 4,981,676 A | 1/1991 | Minet et al. |
| 4,999,107 A | 3/1991 | Guerif |
| 5,030,661 A | 7/1991 | Lywood |
| 5,032,365 A | 7/1991 | Aono et al. |
| 5,062,792 A | 11/1991 | Maghon |
| 5,112,219 A | 5/1992 | Hiemstra |
| 5,126,045 A | 6/1992 | Kohlheb et al. |
| 5,139,541 A | 8/1992 | Edlund |
| 5,143,800 A | 9/1992 | George et al. |
| 5,149,508 A | 9/1992 | Bullock |
| 5,158,581 A | 10/1992 | Coplan |
| 5,175,062 A | 12/1992 | Farooque et al. |
| 5,180,651 A | 1/1993 | Mason |
| 5,205,841 A | 4/1993 | Vaiman |
| 5,210,059 A | 5/1993 | Matturo et al. |
| 5,215,729 A | 6/1993 | Buxbaum |
| 5,217,506 A | 6/1993 | Edlund et al. |
| 5,225,080 A | 7/1993 | Karbachsch et al. |
| 5,226,928 A | 7/1993 | Makabe et al. |
| 5,229,102 A | 7/1993 | Minet et al. |
| 5,259,870 A | 11/1993 | Edlund |
| 5,306,577 A | 4/1994 | Sprouse |
| 5,326,550 A | 7/1994 | Adris et al. |
| 5,335,628 A | 8/1994 | Dunbar |
| 5,344,721 A | 9/1994 | Sonai et al. |
| 5,354,547 A | 10/1994 | Rao et al. |
| 5,376,167 A | 12/1994 | Broutin et al. |
| 5,382,271 A | 1/1995 | Ng et al. |
| 5,393,325 A | 2/1995 | Edlund |
| 5,395,425 A | 3/1995 | Brown |
| 5,401,589 A | 3/1995 | Palmer et al. |
| 5,409,785 A | 4/1995 | Nakano et al. |
| 5,417,051 A | 5/1995 | Ankersmit et al. |
| 5,417,062 A | 5/1995 | Swars et al. |
| 5,425,332 A | 6/1995 | Rabinovich et al. |
| RE35,002 E | 7/1995 | Matsubara et al. |
| 5,432,710 A | 7/1995 | Ishimaru et al. |
| 5,437,250 A | 8/1995 | Rabinovich et al. |
| 5,449,848 A | 9/1995 | Itoh |
| 5,458,857 A | 10/1995 | Collins et al. |

| | | |
|---|---|---|
| 5,470,360 A | 11/1995 | Sederquist |
| 5,470,670 A | 11/1995 | Yasumoto et al. |
| 5,498,278 A | 3/1996 | Edlund |
| 5,500,122 A | 3/1996 | Schwartz |
| 5,509,942 A | 4/1996 | Dodge |
| 5,525,322 A | 6/1996 | Willms |
| 5,527,632 A | 6/1996 | Gardner |
| 5,536,405 A | 7/1996 | Myrna et al. |
| 5,580,523 A | 12/1996 | Bard |
| 5,589,599 A | 12/1996 | McMullen et al. |
| 5,612,012 A | 3/1997 | Soma et al. |
| 5,614,001 A | 3/1997 | Kosaka et al. |
| 5,616,430 A | 4/1997 | Aoyama |
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,679,249 A | 10/1997 | Fendya et al. |
| 5,705,082 A | 1/1998 | Hinson |
| 5,705,916 A | 1/1998 | Rudbeck et al. |
| 5,712,052 A | 1/1998 | Kawatsu |
| 5,714,276 A | 2/1998 | Okamoto |
| 5,734,092 A | 3/1998 | Wang et al. |
| 5,738,708 A | 4/1998 | Peachey et al. |
| 5,741,474 A | 4/1998 | Isomura et al. |
| 5,741,605 A | 4/1998 | Gillett et al. |
| 5,744,067 A | 4/1998 | Jahnke |
| 5,759,712 A | 6/1998 | Hockaday |
| 5,780,179 A | 7/1998 | Okamoto |
| 5,782,960 A | 7/1998 | Ogawa et al. |
| 5,795,666 A | 8/1998 | Johnssen |
| 5,798,186 A | 8/1998 | Fletcher et al. |
| 5,814,112 A | 9/1998 | Elliott et al. |
| 5,821,185 A | 10/1998 | White et al. |
| 5,833,723 A | 11/1998 | Kuwabara et al. |
| 5,858,314 A | 1/1999 | Hsu et al. |
| 5,861,137 A | 1/1999 | Edlund |
| 5,874,051 A | 2/1999 | Heil et al. |
| 5,888,273 A | 3/1999 | Buxbaum |
| 5,891,222 A | 4/1999 | Hilgendorff et al. |
| 5,897,766 A | 4/1999 | Kawatsu |
| 5,897,970 A | 4/1999 | Isomura et al. |
| 5,904,754 A | 5/1999 | Juda et al. |
| 5,931,987 A | 8/1999 | Buxbaum |
| 5,932,181 A | 8/1999 | Kim et al. |
| 5,938,800 A | 8/1999 | Verrill et al. |
| 6,043,288 A * | 3/2000 | DeGeorge et al. ............ 518/715 |
| 6,152,995 A | 11/2000 | Edlund |
| 6,165,633 A | 12/2000 | Negishi |
| 6,168,650 B1 | 1/2001 | Buxbaum |
| 6,171,574 B1 | 1/2001 | Juda et al. |
| 6,180,272 B1 | 1/2001 | Byrne et al. |
| 6,183,543 B1 | 2/2001 | Buxbuam |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,224,789 B1 | 5/2001 | Dybkjaer |
| 6,230,494 B1 | 5/2001 | Botti et al. |
| 6,231,831 B1 | 5/2001 | Autenrieth et al. |
| 6,238,465 B1 | 5/2001 | Juda et al. |
| 6,242,120 B1 | 6/2001 | Herron |
| 6,319,306 B1 | 11/2001 | Edlund et al. |
| 6,328,945 B1 | 12/2001 | Hufton et al. |
| 6,332,913 B1 | 12/2001 | Breitschwerdt et al. |
| 6,350,297 B1 | 2/2002 | Doyle et al. |
| 6,375,906 B1 | 4/2002 | Edlund et al. |
| 6,376,113 B1 | 4/2002 | Edlund et al. |
| 6,379,524 B1 | 4/2002 | Lee et al. |
| 6,383,670 B1 | 5/2002 | Edlund et al. |
| 6,395,405 B1 | 5/2002 | Buxbaum |
| 6,419,728 B1 | 7/2002 | Edlund |
| 6,423,896 B1 | 7/2002 | Keegan |
| 6,428,758 B1 | 8/2002 | Schuessler et al. |
| 6,451,464 B1 | 9/2002 | Edlund et al. |
| 6,458,189 B1 | 10/2002 | Edlund et al. |
| 6,461,408 B2 | 10/2002 | Buxbaum |
| 6,464,947 B2 | 10/2002 | Balland |
| 6,465,118 B1 | 10/2002 | Dickman et al. |
| 6,481,641 B1 | 11/2002 | Mieney |
| 6,485,852 B1 | 11/2002 | Miller et al. |
| 6,494,937 B1 | 12/2002 | Edlund et al. |
| 6,495,277 B1 | 12/2002 | Edlund et al. |
| 6,521,204 B1 | 2/2003 | Borup et al. |
| 6,537,352 B2 | 3/2003 | Edlund et al. |
| 6,547,858 B1 | 4/2003 | Edlund et al. |
| 6,548,197 B1 | 4/2003 | Chandran et al. |
| 6,562,111 B2 | 5/2003 | Edlund et al. |
| 6,562,496 B2 | 5/2003 | Faville et al. |
| 6,562,502 B2 | 5/2003 | Haltiner, Jr. |
| 6,569,227 B2 | 5/2003 | Edlund et al. |
| 6,596,057 B2 | 7/2003 | Edlund et al. |
| 6,608,463 B1 | 8/2003 | Kelly et al. |
| 6,632,270 B2 | 10/2003 | Edlund et al. |
| 6,641,795 B2 | 11/2003 | Abe |
| 6,660,069 B2 | 12/2003 | Sato et al. |
| 6,682,841 B1 | 1/2004 | Armstrong et al. |
| 6,719,831 B2 | 4/2004 | Edlund et al. |
| 6,719,832 B2 | 4/2004 | Edlund et al. |
| 6,723,156 B2 | 4/2004 | Edlund et al. |
| 6,767,389 B2 | 7/2004 | Edlund et al. |
| 6,783,741 B2 | 8/2004 | Edlund et al. |
| 6,793,899 B2 | 9/2004 | Bromberg et al. |
| 6,818,198 B2 * | 11/2004 | Singh et al. .................. 423/652 |
| 6,824,593 B2 | 11/2004 | Edlund et al. |
| 6,890,672 B2 | 5/2005 | Dickman et al. |
| 6,929,785 B2 | 8/2005 | Grieve et al. |
| 6,936,238 B2 * | 8/2005 | Sennoun et al. ............. 423/652 |
| 2001/0031387 A1 | 10/2001 | Takeda et al. |
| 2002/0041837 A1 | 4/2002 | Edlund et al. |
| 2003/0167690 A1 | 9/2003 | Edlund et al. |
| 2003/0192251 A1 * | 10/2003 | Edlund et al. ................ 48/127.9 |
| 2003/0223926 A1 | 12/2003 | Edlund et al. |
| 2004/0003720 A1 | 1/2004 | Beisswenger et al. |
| 2004/0083890 A1 | 5/2004 | Edlund et al. |
| 2004/0126643 A1 | 7/2004 | Kinkelaar et al. |
| 2004/0155065 A1 | 8/2004 | Kinkelaar et al. |
| 2005/0188843 A1 | 9/2005 | Edlund et al. |
| 2005/0210881 A1 * | 9/2005 | Balan et al. ..................... 60/780 |
| 2006/0090397 A1 | 5/2006 | Edlund et al. |

FOREIGN PATENT DOCUMENTS

| | | |
|---|---|---|
| CA | 1238866 | 7/1988 |
| CA | 2252073 | 5/2003 |
| DE | 19747010 A1 | 4/1999 |
| EP | 0247384 A2 | 12/1987 |
| EP | 0434562 A1 | 6/1991 |
| EP | 0878442 A1 | 11/1998 |
| EP | 0913357 A1 | 5/1999 |
| EP | 0920064 A1 | 6/1999 |
| EP | 1065741 A2 | 1/2001 |
| EP | 1085261 A1 | 3/2001 |
| EP | 1231183 A2 | 8/2002 |
| EP | 1231184 A9 | 8/2002 |
| EP | 1047144 B1 | 9/2005 |
| GB | 2268694 | 1/1994 |
| JP | 45-14404 | 5/1970 |
| JP | 45-2642 | 9/1970 |
| JP | 57-145276 | 9/1982 |
| JP | 1-145302 | 6/1989 |
| JP | 1-145303 | 6/1989 |
| JP | 1-262903 | 10/1989 |
| JP | 4-163860 | 6/1992 |
| JP | 4-338101 | 11/1992 |
| JP | 6-134244 | 5/1994 |
| JP | 10-263372 | 10/1998 |
| WO | WO 97/11904 | 4/1997 |
| WO | WO 97/25649 | 7/1997 |
| WO | WO 97/43796 | 11/1997 |
| WO | WO 99/30806 | 6/1999 |
| WO | WO 99/65097 | 12/1999 |
| WO | WO 00/04600 | 1/2000 |
| WO | WO 00/22690 | 4/2000 |
| WO | WO 00/26518 | 5/2000 |
| WO | WO 00/27507 | 5/2000 |

| | | |
|---|---|---|
| WO | WO 00/27518 | 5/2000 |
| WO | WO 01/12539 | 2/2001 |
| WO | WO 01/28662 | 4/2001 |
| WO | WO 01/64321 | 9/2001 |
| WO | WO 01/68514 | 9/2001 |
| WO | WO 01/83086 | 11/2001 |

OTHER PUBLICATIONS

English-language abstract of Japanese Patent Publication No. 58-108291, 1983.
English-language abstract of Japanese Patent Publication No. 58-219945, 1983.
English-language abstract of Japanese Patent Publication No. 61-269864, 1986.
English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent Publication No. 03-247501, 1991.
English-language abstract of Japanese Patent No. 4-163860, Jun. 1992.
English-language abstract of Japanese Patent No. 432150, 1992.
English-language abstract of Japanese Patent No. 4-338101, 1992.
English-language abstract of Japanese Patent Publication No. 04-074701, 1992.
English-language abstract of Japanese Patent Publication No. 04-164802, 1992.
English-language abstract of Japanese Patent No. 5132301, 1993.
English-language abstract of Japanese Patent No. 5147902, 1993.
English-language abstract of Japanese Patent Publication No. 05-147903, 1993.
English-language abstract of Japanese Patent No. 6040701, 1994.
English-language abstract of Japanese Patent No. 6-134244, 1994.
English-language abstract of Japanese Patent No. 6176779, 1994.
English-language abstract of Japanese Patent No. 6345408, 1994.
English-language abstract of Japanese Patent No. 7057758, 1995.
English-language abstract of Japanese Patent No. 710910, 1995.
English-language abstract of Japanese Patent No. 8287932, 1996.
English-language abstract of Great Britain Patent No. 2,305,186, 1997.
English-language abstract of German language PCT Patent Publication No. WO 97/43796, 1997.
English-language abstract of Japanese Patent No. 10-263372, 1998.
English-language abstract of Japanese Patent No. 11116202, 1999.
English-language abstract of German Patent No. DE 19747010, 1999.
English-language abstract of German language PCT Patent Publication Serial No. WO 00/04600, Jan. 2000.
English-language abstract of German language PCT Patent Publication No. WO 01/64321, 2001.
Fig. 1 of Taiwan Patent Publication No. 301473, undated, which was cited in a communication received Jul. 21, 2004 from a foreign patent office in a counterpart foreign application.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Allison Gas Turbine Division, General Motors Corporation, "Research and Development of Proton-Exchange-Membrane (PEM) Fuel Cell System for Transportation Applications," prepared for U.S. Department of Energy Office of Transportation Technologies, pp. i-x and 1-178, Jan. 1996.
Amphlett, J. C., et al., "On Board Hydrogen Purification for Steam Reformer/PEM Fuel Cell Vehicle Power Plants," Energy Progress X, Proceedings of the 10$^{th}$ World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).

Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
"Compact, Lightweight Fuel Reformer for Fuel Cells," Argonne National Laboratory/U.S. Department of Energy (Jul. 1996).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
Emonts, B., et al., "Compact Methanol Reformer Test for Fuel-Cell Powered Light-Duty Vehicles," Fifth Grove Fuel Cell Symposium, Commonwealth Institute,London, U.K., (no page. no.), (Sep. 22-25, 1997).
Green, J. B., et al., "Experimental Evaluation of SI Engine Operation Supplemented By Hydrogen Rich Gas from a Compact Plasma Boosted Reformer," SAE International, Government/Industry Meeting, Washington, D.C., pp. 1-8, Jun. 19-21, 2000.
Jorgensen, S. Lwgsgaard, et al., "Application of Pd-Membranes for the Production of Pure Hydrogen in Methanol-Based Fuel Cell Powered Vehicles,", Proceedings of Fourth Workshop: Optimisation of Catalytic Membrane Reactor Systems, ESF Network, Catalytic Membrane Reactors, Oslo, Norway, pp. 51-57 (May 30-31, 1997).
Knapton, A. G., "Palladium Alloys for Hydrogen Diffusion Membranes," Platinum Metals Review, vol. 21, 44-50 (1977).
Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page no.), (Sep. 22-25, 1997).
Minet, R. G., et al., "Experimental Studies of A Ceramic Membrane Reactor for the Steam/Methane Reaction at Moderate Temperatures (400-700°C)," Symposium on Natural Gas Upgrading II Presented before The Division of Petroleum Chemistry, Inc., Meeting of American Chemical Society, San Francisco, California, U.S.A., pp. 245-248 (Apr. 1992).
"MIT device could lead to near-term environmental improvements for cars," Oct. 23, 1997, Massachusetts Institute of Technology Web site, http://web.mit.edu/newsoffice/1997/print/plasmatron-print.html, pp. 1-2, accessed Aug. 4, 2006.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.
Shu, J., et al., "Catalytic Palladium-Based Membrane Reactors: A Review," The Canadian Journal of Chemical Engineering, vol. 69, pp. 1036-1060 (Oct. 1991).
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).
US 6,340,380, 01/2002, Frost et al. (withdrawn)

* cited by examiner

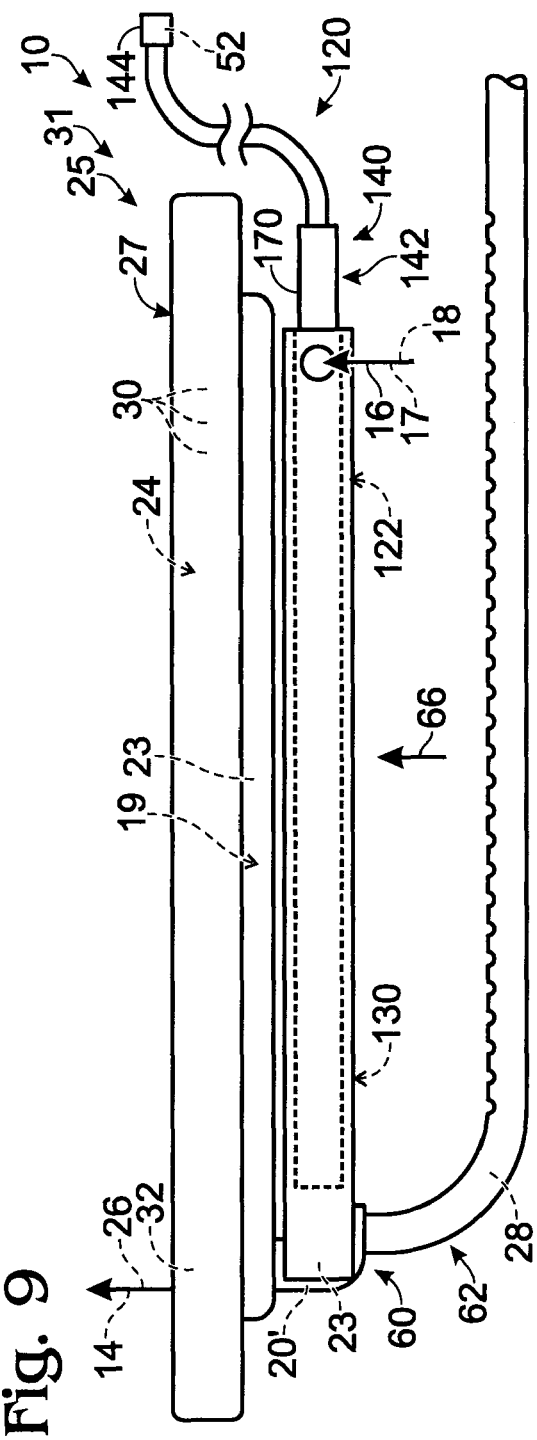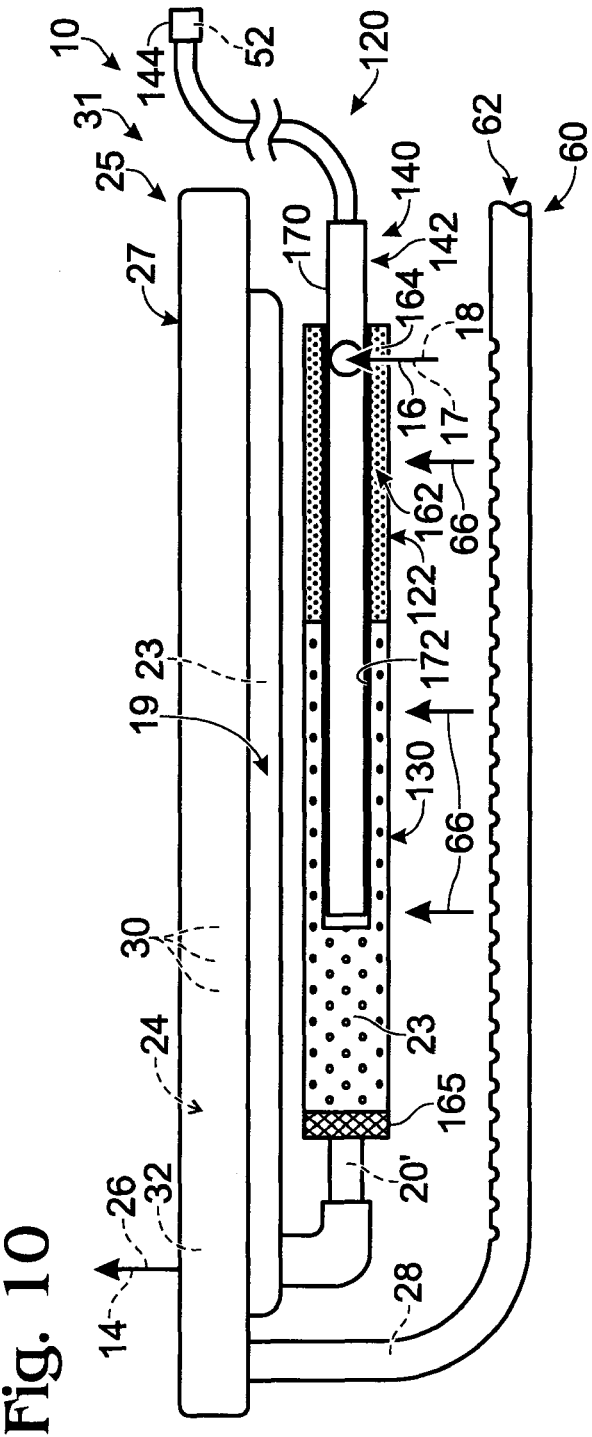

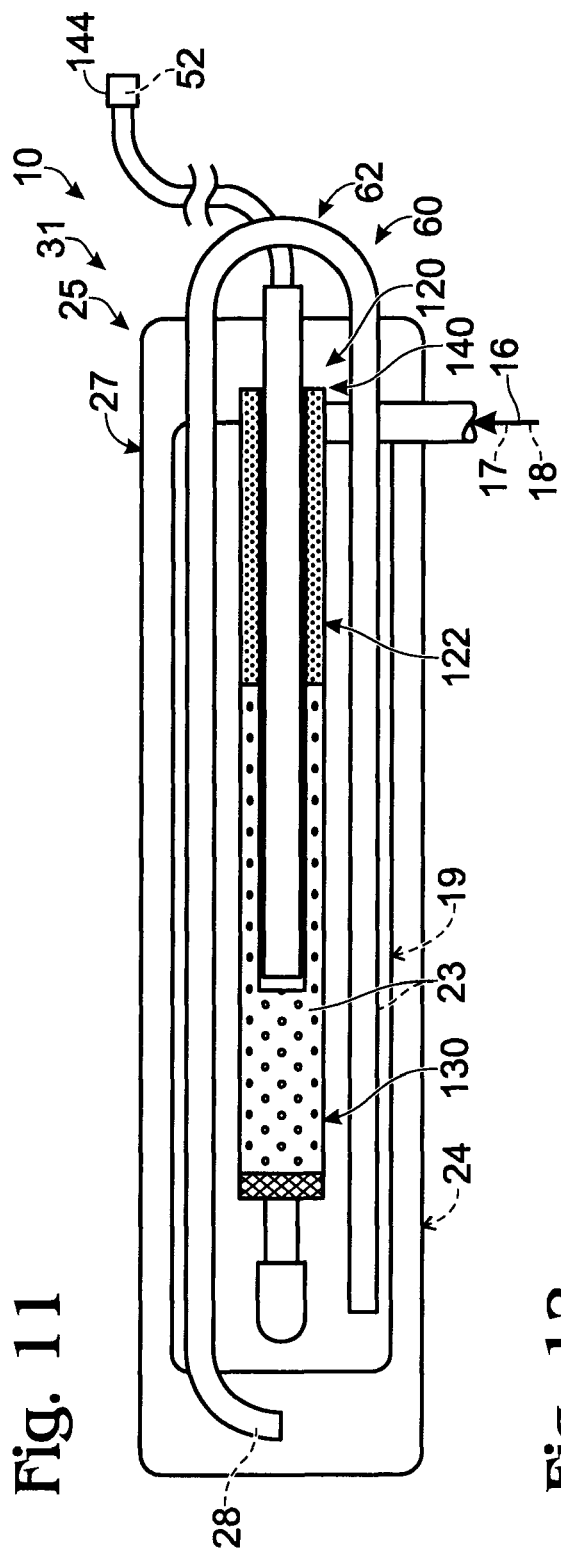
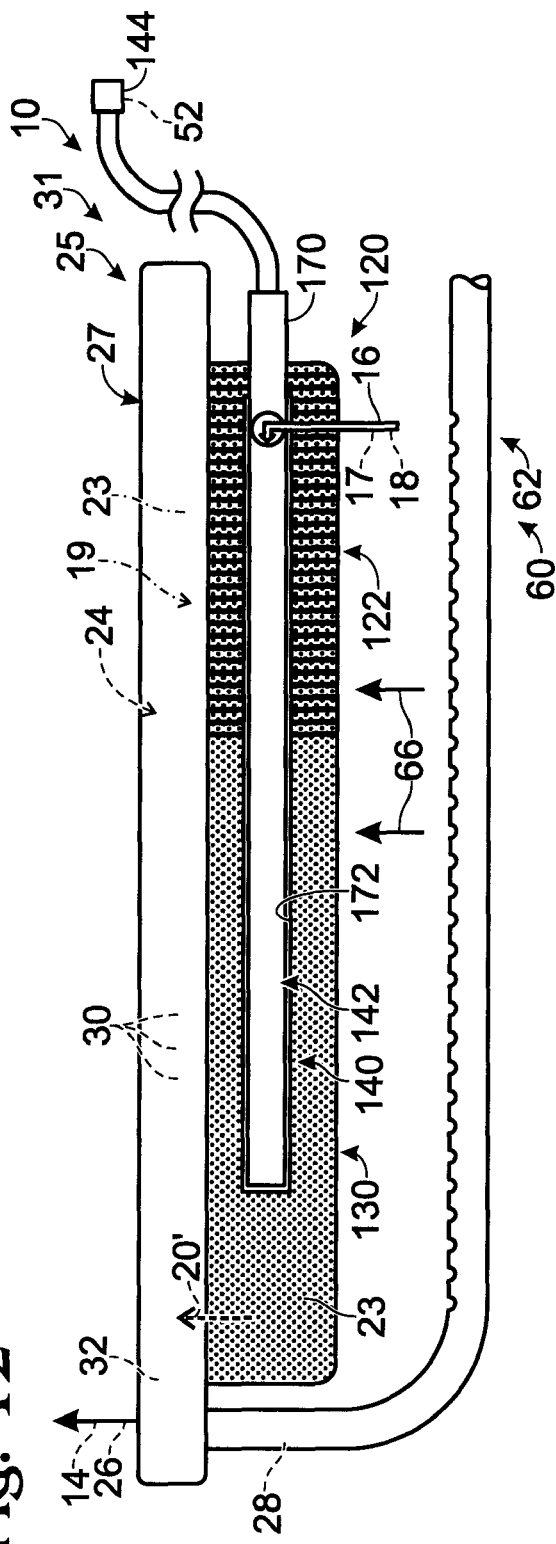
Fig. 11
Fig. 12

HYDROGEN-PRODUCING FUEL PROCESSING ASSEMBLIES, HEATING ASSEMBLIES, AND METHODS OF OPERATING THE SAME

RELATED APPLICATION

The present application claims priority to similarly entitled U.S. Provisional Patent Application Ser. No. 60/802,995, which was filed on May 23, 2006 and the complete disclosure of which is hereby incorporated by reference.

FIELD OF THE DISCLOSURE

The present disclosure is related generally to hydrogen-producing fuel processing systems that are adapted to produce primarily hydrogen gas via a steam reforming reaction, and more particularly to systems and methods for initiating hydrogen production of the same.

BACKGROUND OF THE DISCLOSURE

Purified hydrogen gas is used in the manufacture of many products including metals, edible fats and oils, and semiconductors and microelectronics. Purified hydrogen gas is also an important fuel source for many energy conversion devices. For example, fuel cells use purified hydrogen gas and an oxidant to produce an electrical potential. Various processes and devices may be used to produce the hydrogen gas that is consumed by the fuel cells. One such process is steam reforming, in which hydrogen gas is produced as a majority reaction product from a carbon-containing feedstock and water.

Steam reforming of water and a carbon-containing feedstock to produce hydrogen gas is an endothermic reaction. Hydrogen-producing steam reforming reactions are typically performed at elevated temperatures and pressures, such as temperatures of at least 200° C., and more typically at least 350° C., and pressures of at least 50 psi. The desired steam reforming temperature, or range of temperatures, will tend to vary according to a variety of factors, including the composition of the carbon-containing feedstock. As an illustrative example, steam reforming of methanol to produce hydrogen gas is typically performed at a temperature of 350-450° C., while many hydrocarbons are reformed to produce hydrogen gas at a temperature of 700-850° C.

When a hydrogen-producing steam reformer is initially started up from an unheated, or off, operating state, at least the hydrogen-producing region of the steam reformer needs to be initially heated to at least a minimum hydrogen-producing temperature. Because the steam reforming reaction is endothermic, the hydrogen-producing region is often heated to above this minimum hydrogen-producing temperature before water and the carbon-containing feedstock are delivered thereto, typically in gaseous form, to produce hydrogen gas therefrom. A heating assembly is typically utilized to provide the required preheating of the hydrogen-producing region, with burners, resistive heaters, and combustion catalysts being the most common sources of the required heating. Burners and combustion catalysts require the delivery of a suitable combustible fuel stream, the presence or delivery of a sufficient air stream to support the combustion, and suitable controls and delivery conduits to safely and reliably deliver and combust the fuel stream and to deliver the heated exhaust stream produced thereby to heat at least the hydrogen-producing region of the steam reformer. Electrically powered heaters require a sufficient power source for the heaters to generate sufficient heat throughout the hydrogen-producing region.

BRIEF DESCRIPTION OF THE DRAWINGS

FIG. 9 is a side elevation view of another illustrative startup assembly according to the present disclosure and a portion of a fuel processing assembly for use therewith.

FIG. 10 is a side elevation view of another illustrative startup assembly according to the present disclosure and a portion of a fuel processing assembly for use therewith.

FIG. 11 is a bottom plan view of the startup assembly and the portion of fuel processing assembly of FIG. 10.

FIG. 12 is a side elevation view of another illustrative startup assembly according to the present disclosure and a portion of a fuel processing assembly for use therewith.

DETAILED DESCRIPTION AND BEST MODE OF THE DISCLOSURE

Figure 1:
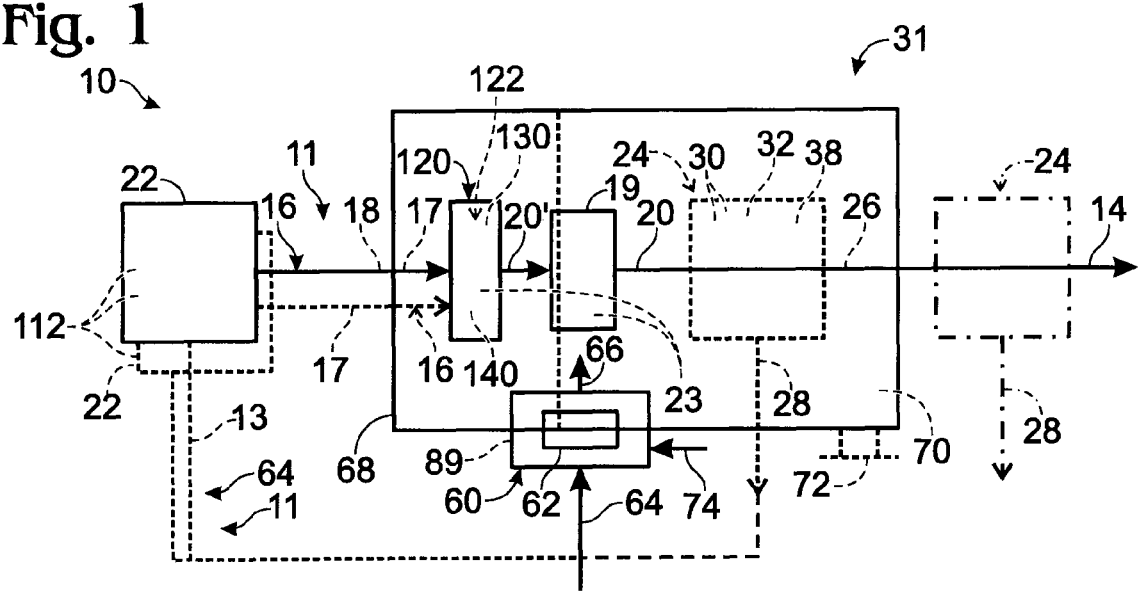
FIG. 1 is a schematic view of a steam reforming hydrogen generation assembly with a startup assembly according to the present disclosure.

A steam reforming hydrogen generation assembly according to the present disclosure is schematically illustrated in FIG. 1 and generally indicated at 10. Hydrogen generation assembly 10 includes a feedstock delivery system 22 and a hydrogen-producing fuel processing assembly 31. Fuel processing assembly, or system, 31, is adapted to receive at least one feed stream 16 containing water 17 and a carbon-containing feedstock 18 from the feedstock delivery system. Illustrative, non-exclusive examples of suitable carbon-containing feedstocks 18 include at least one hydrocarbon or alcohol. Illustrative, non-exclusive examples of suitable hydrocarbons include methane, propane, natural gas, diesel, kerosene, gasoline and the like. Examples of suitable alcohols include methanol, ethanol, and polyols, such as ethylene glycol and propylene glycol. While not required to all embodiments, in some embodiments the carbon-containing feedstock will be a liquid carbon-containing feedstock, and in some embodiments the carbon-containing feedstock will be miscible with water.

The fuel processing assembly chemically reacts the water and the carbon-containing feedstock in the presence of a suitable steam reforming catalyst 23 and produces a product hydrogen stream 14 containing hydrogen gas as a majority component. In some embodiments, the product hydrogen stream contains pure, or at least substantially pure, hydrogen gas. Fuel processing assembly 31 includes a hydrogen-producing region 19, in which an output stream 20 containing hydrogen gas is produced by a steam reforming reaction that utilizes a suitable steam reforming catalyst 23, as indicated in dashed lines in FIG. 1. Illustrative, non-exclusive examples of suitable steam reforming catalysts are disclosed in U.S. Patent Application Publication No. 2006/0236607, the complete disclosure of which is hereby incorporated by reference. Output stream 20 includes hydrogen gas as at least a majority component.

Output stream 20 may include one or more additional gaseous components, and thereby may be referred to as a mixed gas stream that contains hydrogen gas as its majority component but which also includes other gases. Examples of other gases that may be present in the reformate stream from the steam reforming reaction that occurs in hydrogen-producing region 19 include carbon monoxide, carbon dioxide, methane, steam, and/or unreacted carbon-containing feedstock. In a steam reforming process, the fuel processing assembly 31 may be referred to as a steam reformer, hydrogen-producing region 19 may be referred to as a reforming region, and output, or mixed gas, stream 20 may be referred to as a reformate stream.

As discussed in more detail herein, hydrogen generation assemblies 10 according to the present disclosure may, but are not required to, include at least one purification region 24 in which the concentration of hydrogen gas in output, or reformate, stream 20 is increased and/or the concentration of at least one of the other gases in the output stream is reduced. Purification region 24 is schematically illustrated in FIG. 1, where output stream 20 is shown being delivered to an optional purification region 24. In some embodiments, the purification region may separate the output stream into a hydrogen-rich stream 26 and a byproduct stream 28. In such an embodiment, the product hydrogen stream contains at least one of a greater concentration of hydrogen gas and/or a lower concentration of at least one of the other gases relative to the output stream.

As shown in FIG. 1, product hydrogen stream 14 includes at least a portion of hydrogen-rich stream 26. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, and/or consumed by the fuel processing assembly.

Byproduct stream 28 contains at least a substantial portion of one or more of the other gases and may, but is not required to, include some hydrogen gas. When present, byproduct stream 28 may be exhausted, sent to a burner assembly or other combustion source, used as a heated fluid stream, stored for later use, or otherwise utilized, stored, or disposed of. It is within the scope of the disclosure that byproduct stream 28 may be emitted from the purification region as a continuous stream, such as responsive to the delivery of output stream 20 to the purification region, or intermittently, such as in a batch process when the byproduct portion of the output stream is retained at least temporarily in the purification region. In some embodiments, the byproduct stream may contain sufficient hydrogen gas and/or combustible other gases that the byproduct stream may be used as a gaseous fuel stream for a burner, combustion region, or other heating assembly that is adapted to combust a fuel stream in the presence of air to produce a heated output stream.

As discussed in more detail herein, hydrogen generation assembly 10 may include such a heating assembly that is adapted to combust the byproduct stream to produce a heated output stream, or heated exhaust stream, to heat at least the hydrogen-producing region of the fuel processing assembly. In some embodiments, the byproduct stream may have sufficient fuel value (i.e., hydrogen gas content) to enable the heating assembly, when present, to maintain the hydrogen-producing region at a desired operating (i.e. hydrogen-producing) temperature, above a minimum hydrogen-producing temperature, and/or within a selected range of temperatures. Therefore, while not required, it is within the scope of the present disclosure that the byproduct stream may include hydrogen gas, such as 10-30 wt % hydrogen gas, 15-25 wt % hydrogen gas, 20-30 wt % hydrogen gas, at least 10 or 15 wt % hydrogen gas, at least 20 wt % hydrogen gas, etc.

Producing hydrogen gas by steam reforming water and a carbon-containing feedstock is an endothermic reaction. Accordingly, hydrogen generation assembly 10 requires a heat source, or heating assembly, 60 that is adapted to heat at least hydrogen-producing region 19 of the fuel processing assembly to a suitable temperature, or range of temperatures, for producing hydrogen gas therein and to maintain the hydrogen-producing region at this temperature, or within this temperature range, while the hydrogen-producing region is needed to produce hydrogen gas. As an illustrative example of temperatures that may be achieved and/or maintained in hydrogen-producing region 19 through the use of heating assembly 60, steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the carbon-containing feedstock includes a hydrocarbon, in some embodiments it may be desirable to include two different hydrogen-producing portions, or regions, with one operating at a lower temperature than the other to provide a pre-reforming region. In such an embodiment, the fuel processing system may alternatively be described as including two or more hydrogen-producing regions, and/or as including two or more hydrogen-producing regions that are connected in series, with the output stream from the first region forming at least a portion of the feed stream for the second hydrogen-producing region.

In the illustrative, non-exclusive example shown in FIG. 1, fuel processing assembly 31 includes a hydrogen-producing region 19 and a heating assembly 60. Heating assembly 60 is adapted to produce a heated exhaust stream, or combustion stream, 66 from heating fuel stream 64, typically as combusted in the presence of air. Stream 66 is schematically illustrated in FIG. 1 as heating hydrogen-producing region 19, such as to a suitable hydrogen-producing temperature or range of temperatures. Heating assembly 60 may utilize any suitable structure for generating heated exhaust stream 66, such as a burner or combustion catalyst in which a fuel is combusted with air to produce the heated exhaust stream. Heating assembly 60 may include an ignitor, or ignition source, 89 that is adapted to initiate the combustion of fuel, and thereby the generation of exhaust stream 66. Illustrative examples of suitable ignition sources include one or more of spark plugs, glow plugs, combustion catalyst, pilot lights, piezoelectric ignitors, and the like.

In some hydrogen-producing fuel processing assemblies according to the present disclosure, heating assembly 60 includes a burner assembly 62 and may be referred to as a combustion-based, or combustion-driven, heating assembly. In a combustion-based heating assembly, the heating assembly 60 is adapted to receive at least one fuel stream 64 and to combust the fuel stream in the presence of air to provide a hot combustion stream 66 that may be used to heat at least the hydrogen-producing region 19 of the fuel processing assembly. As discussed in more detail herein, air may be delivered to the heating assembly via a variety of mechanisms. In FIG. 1, an air stream 74 is shown; however, it is within the scope of the disclosure for the air stream to additionally or alternatively be delivered to the heating assembly with at least one of the fuel streams 64 for the heating assembly 60 and/or drawn from the environment within which the heating assembly is utilized. Illustrative, non-exclusive examples of burner assemblies that may be utilized in hydrogen-producing fuel processing systems are disclosed in U.S. Patent Application Publication Nos. 2003/0223926 and 2006/0090397, the complete disclosures of which are hereby incorporated by reference for all purposes.

It is within the scope of the disclosure that combustion stream 66 may additionally or alternatively be used to heat other portions of the fuel processing assembly. It is also within the scope of the present disclosure that other configurations and types of heating assemblies 60 may be utilized. As an illustrative example, a heating assembly 60 may be an electrically powered heating assembly that is adapted to heat at least the hydrogen-producing region of the fuel processing assembly by generating heat using at least one heating element, such as a resistive heating element. Therefore, it is not required that heating assembly 60 receive and combust a combustible fuel stream to heat hydrogen-producing region 19 to a suitable hydrogen-producing temperature. Additional non-exclusive examples of heating assemblies that may be utilized in hydrogen generation assemblies, hydrogen-producing fuel processing assemblies, and the like according to the present disclosure are disclosed in U.S. Patent Application Publication No. 2006/0272212, the complete disclosure of which is hereby incorporated by reference for all purposes.

As also schematically illustrated in FIG. 1, it is within the scope of the present disclosure that heating assembly 60 is housed in a common shell, or housing, 68 with the hydrogen-producing region and/or purification region(s), although this construction is not required. It is also within the scope of the present disclosure that the heating assembly may be separately positioned relative to the hydrogen-producing region but in thermal and/or fluid communication therewith to provide the desired heating of at least the hydrogen-producing region. In FIG. 1, heating assembly 60 is shown in an overlapping relationship with fuel processing assembly 31 to graphically represent that it is within the scope of the disclosure that the heating assembly may be located partially or completely within fuel processing assembly 31, such as being at least partially within shell 68, and/or that at least a portion, or all, of the heating assembly may be located external the fuel processing assembly. In this latter embodiment, the hot combustion gases from the burner assembly will be delivered via suitable heat transfer conduits to the hydrogen-producing region or other portion of the assembly to be heated.

Depending on the configuration of the hydrogen generation assembly 10 and fuel processing assembly 31, heating assembly 60 may be configured to heat the feedstock delivery system, the at least one feed stream emitted therefrom, the hydrogen-producing region, the purification (or separation) region, or any combination of these elements or selected components thereof. The heating of the one or more feed streams may include vaporizing liquid components of the feed stream(s). The heating assembly 60 may also be configured to heat other components of the hydrogen generation assembly 10. For example, the heated exhaust stream may be adapted to heat a pressure vessel or other canister containing the heating fuel and/or the hydrogen-production fluid that form at least portions of streams 16 and 64. While not required, increasing the temperature of a vessel may increase the pressure of the fluids stored within the vessel, which may be desirable in some applications.

Hydrogen generation assemblies 10 according to the present disclosure may include a feedstock delivery system 22 that is adapted to selectively deliver at least one feed stream 16 to at least the hydrogen-producing region of the fuel processing assembly. In some embodiments, the feedstock delivery system is further adapted to at least selectively deliver fuel stream 64 to a burner 62, combustion catalyst, or other heating assembly 60 that is adapted to heat at least the hydrogen-producing region 19, such as to heat (and optionally maintain) the region at a suitable hydrogen-producing temperature. Feedstock delivery system 22 may utilize any suitable delivery mechanism. In the embodiment shown schematically in FIG. 1, feedstock delivery system 22 is adapted to deliver two feedstock supply streams 11, namely, a feed stream, or hydrogen-production fluid supply stream, 16, which contains water 17 and a carbon-containing feedstock 18 and is adapted to be delivered to hydrogen-producing region 19 of the fuel processing system, and a heating fuel supply stream 64, which contains at least one combustible fuel 13 and is adapted to be delivered to heating assembly 60. In some embodiments, feedstock delivery system 22 will not deliver a fuel or other stream to heating assembly 60. In some embodiments, heating assembly 60 may be adapted to receive only byproduct stream 28 (and optionally a portion of hydrogen-rich stream 26) as its combustible fuel stream.

While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. Similarly, FIG. 1 also illustrates in dashed lines that each feed stream 16 may (but is not required to) be associated with a different feedstock delivery system 22, or portions thereof. For example, when more than one feedstock delivery system 22 is utilized, the systems may (but are not required to) draw at least a portion of their outlet streams from a common supply. When feed stream 16 contains two or more components, such as a carbon-containing feedstock and water, the components may be delivered in the same or different feed streams.

For example, when a liquid carbon-containing feedstock is used that is miscible with water, such as methanol or another water-soluble alcohol, the feedstock delivery system may be (but is not required to be) adapted to deliver a liquid feed stream 16 that contains a mixture of water and the carbon-containing feedstock. The ratio of water to carbon-containing feedstock in such a feed stream may vary according to such factors as the particular carbon-containing feedstock being used, user preferences, the design of the hydrogen-production region, etc. Typically the molar ratio of water to carbon will be approximately 1:1 to 3:1. Mixtures of water and methanol will often be delivered at or near a 1:1 molar ratio (31 vol % water, 69 vol % methanol), while mixtures of hydrocarbons or other alcohols will often be delivered at a molar ratio greater than 1:1 water-to-carbon.

As a further illustrative example, a reforming feed stream 16 may contain approximately 25-75 vol % methanol or ethanol or another suitable water-miscible carbon-containing feedstock, and approximately 25-75 vol % water. For feed streams formed (at least substantially) of methanol and water, the streams will typically contain approximately 50-75 vol % methanol and approximately 25-50 vol % water. Streams containing ethanol or other water-miscible alcohols will typically contain approximately 25-60 vol % alcohol and approximately 40-75 vol % water. An example of a particularly well-suited feed stream for hydrogen-generating assemblies that utilize steam reforming reactions contains 69 vol % methanol and 31 vol % water, although other compositions and liquid carbon-containing feedstocks may be used without departing from the scope of the present disclosure.

While not required, it is within the scope of the present disclosure that such a feed stream that contains both water and at least one carbon-containing feedstock may be used as the feed stream for hydrogen-producing region 19 and as a combustible fuel stream for a heating assembly that is adapted to heat at least the hydrogen-producing region of the fuel processing assembly. A potential benefit of such a construction is that the hydrogen generation assembly that produces hydrogen gas from water and a carbon-containing feedstock does not need to include more than a single supply 112, if the water and water-soluble liquid carbon-containing feedstock are premixed. It is also within the scope of the present disclosure that a feedstock delivery system 22 may deliver the components of the hydrogen production fluid, or feed stream, to the fuel processing assembly in two or more streams, with these streams having the same or different compositions. For example, the carbon-containing feedstock and water may be delivered in separate streams, and optionally (at least until both streams are vaporized or otherwise gaseous), when they are not miscible with each other, such as shown in FIG. 1 by reference numerals 17 and 18 optionally pointing to different feed streams.

It is within the scope of the present disclosure that heating fuel 13 may include any combustible liquid and/or gas that is suitable for being consumed by heating assembly 60 to provide the desired heat output. Some heating fuels 13 according to the present disclosure will be gases when delivered and combusted by heating assembly 60, while others will be delivered to the heating assembly as a liquid stream. Illustrative examples of suitable heating fuels include the previously discussed carbon-containing feedstocks, such as methanol, methane, ethane, ethanol, ethylene, propane, propylene, butane, and butanes, amongst others. Additional examples include low molecular weight condensable fuels such as liquefied petroleum gas, ammonia, lightweight amines, dimethyl ether, and low molecular weight hydrocarbons. Although not required to all embodiments, the heating fuel stream and the hydrogen-production fluid stream may have different individual or overall compositions and may be discharged from the feedstock delivery system in different phases. For example, one of the streams may be a liquid stream while the other is a gas stream. In some embodiments, both of the streams may be liquid streams. In some embodiments, both of the streams may be gas streams.

Illustrative, non-exclusive examples of suitable feedstock delivery systems 22 that may be used with hydrogen-producing fuel processing assemblies (or hydrogen-generation assemblies) according to the present disclosure are disclosed in U.S. Patent Application Publication Nos. 2007/0062116, 2006/0090396, and 2006/0090397. The complete disclosures of the above-identified patent applications are hereby incorporated by reference for all purposes. The above-incorporated applications also disclose additional examples of fuel processing assemblies, fuel cell systems, the components therefor, and methods for operating the same that may selectively be used and/or integrated with other components disclosed, illustrated and/or incorporated herein. Illustrative, nonexclusive examples of suitable hydrogen generation assemblies, and components thereof, are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes. Additional examples are disclosed in U.S. Patent Application Publication Nos. 2006/0060084, 2006/0272212, and 2007/0062116, the complete disclosures of each of which are hereby incorporated by reference for all purposes.

As discussed, steam reforming hydrogen generation assemblies 10 according to the present disclosure include a heating assembly 60 that is adapted to maintain the hydrogen-producing region 19 at a suitable temperature, or within a suitable temperature range, for producing hydrogen gas by steam reforming water and a carbon-containing feedstock. However, sometimes the temperature of the hydrogen-producing region is below a suitable hydrogen-producing temperature, such as when the hydrogen generation assembly is started up from a cold, or unheated, operating state. Conventionally, a fuel stream is delivered to heating assembly 60, either by feedstock delivery system 22 or by a suitable fuel delivery system. In such an embodiment, the hydrogen-producing region must be heated by heating assembly 60 to a suitable hydrogen-producing temperature. While reasonably effective, the time and/or energy/fuel requirements to heat hydrogen-producing region 19 to this temperature may be more than is desirable in some embodiments.

Hydrogen generation assemblies 10 according to the present disclosure include a startup assembly, or preheating assembly, 120 that is adapted to receive feed stream(s) 16 and to vaporize any liquid component thereof. Accordingly, startup assembly 120 may be described as including a vaporization region 122, in which liquid portions of the feed stream or streams are vaporized. In some embodiments, the at least one feed stream 16 is delivered from the feedstock delivery system as a liquid stream, such as a liquid stream that contains water and a liquid carbon-containing feedstock. In other embodiments, at least a portion of the feed stream, such as the carbon-containing feedstock portion thereof, may be delivered as a gas stream. For example, many hydrocarbons are gases under the temperature and pressure at which they are delivered by a suitable feedstock delivery system. For the purpose of simplifying the following discussion, the feedstock delivery system will be described as being adapted to deliver a liquid feed stream that includes water and a liquid carbon-containing feedstock, such as methanol, that is miscible with water. Other compositions and numbers of feed streams are within the scope of the present disclosure, as discussed herein.

As indicated in FIG. 1, startup assembly 120 may also include a steam reforming catalyst 23 that defines a startup reforming region 130 in which some hydrogen gas is produced from the vaporized feed stream via a steam reforming reaction. Startup reforming region 130 is upstream and spaced-apart from hydrogen-producing region 19, which may be referred to as a primary reforming region or a primary steam reforming region. As used herein, "upstream" and "downstream" respectively refer to the relative position of various components and/or regions of the fuel processing assembly with respect to fluid flow thereto. For example, when startup reforming region is described as being upstream from hydrogen-producing region 19, it is meant that fluid from startup reforming region flows (directly or indirectly) to the hydrogen-producing region. Similarly, hydrogen-producing region 19 may be described as being downstream from the startup reforming region because it receives fluid (directly or indirectly) from the startup reforming region. For similar reasons, the feedstock delivery system may be described as being upstream from startup reforming region 130 and hydrogen-producing region 19 because fluid from the feedstock delivery system flows to the startup reforming region and then to the hydrogen-producing region, although the relative flow rate and composition of this fluid stream may change as it flows (and is reacted) from the feedstock delivery system to downstream components of the fuel processing assembly. Similarly, a purification region, if present, may be described as being downstream from feedstock delivery system 22, startup reforming region 130, and hydrogen-producing region 19 because the hydrogen-gas containing stream it receives originates as a feed stream from the feedstock delivery system.

Startup reforming region 130 is adapted to convert at least a portion of the vaporized feed stream to hydrogen gas prior to delivery of the remaining feed stream (and any produced hydrogen gas and other steam reforming reaction products) to hydrogen-producing region 19. Startup reforming region 130 will typically contain less steam reforming catalyst 23 than hydrogen-producing region 19, but this is not a requirement to all startup assemblies according to the present disclosure. Accordingly, it is within the scope of the present disclosure that the startup reforming region 130 may have less, equal, or more reforming catalyst 23 than hydrogen-producing assembly 19 and that regions 130 and 19 may utilize different steam reforming catalysts. In some embodiments, the startup assembly and the hydrogen-producing region are each contained in separate housings, with the housing for the startup assembly being upstream from the housing for the hydrogen-producing region. In some embodiments, both of these housings (and the contents thereof) are heated by heating assembly 60, which in some embodiments does so by combusting a portion of the reformate stream produced by the hydrogen-producing region to produce a heated exhaust stream.

In FIG. 1, the output stream from startup reforming region 130 is indicated at 20' and, as shown, is delivered to hydrogen-producing region 19, where it may thereafter flow to one or more purification regions 24. As discussed herein, stream 20' may include vaporized feed stream, hydrogen gas, and/or other gases produced from partial or complete steam reforming of feed stream 16. Typically, at least a portion of the feed stream will be converted into hydrogen gas in startup reforming region 130. In some embodiments, more than 25%, 25-50%, more than 50%, 50-75%, more than 75%, 75-90%, or more than 90% of the feed stream will be reacted via the steam reforming reaction and thereby converted into hydrogen gas and other reaction products of the steam reforming reaction. The reaction products from the startup reforming region, as well as any unreacted water and/or carbon-containing feedstock portions of the feed stream are then delivered to hydrogen-producing region 19. A potential benefit of some of the feed stream being converted into hydrogen gas (and/or other combustible gases) in the startup reforming region is that this portion of the feed stream will remain in a gaseous state even if it is cooled to a temperature that is less than the vaporization temperature thereof.

It is within the scope of the present disclosure that all of the feed stream, or at least all carbon-containing feedstock in the feed stream, will be converted to gas(es) in the startup reforming region. This gas, or gases, may remain in a gaseous state if cooled from the temperature in the vaporization region and/or startup reforming region. It is not a requirement that the gas, or gases, remain in a gaseous state if cooled to ambient temperature, and/or pressures (such as 25° C. and 1 atm), as opposed to the other temperatures and pressures within regions of the fuel processing assembly within which the gas, or gases, flow. However, such a result is also not precluded from the scope of the present disclosure. In some embodiments, at least a substantial portion of any carbon-containing feedstock in the feed stream(s) is converted via chemical reaction in the startup reforming region into gases having a different composition than the carbon-containing feedstock. In some embodiments, all of the carbon-containing feedstock is converted to gases having a different composition than the carbon-containing feedstock. In an illustrative, non-exclusive example, when the carbon-containing feedstock is methanol, the output stream from the startup assembly may contain less than 50% of the methanol that was present in the feed stream, less than 25% of the methanol that was present in the feed stream, less than 10% of the methanol that was present in the feed stream, less than 2% of the methanol that was present in the feed stream, or even no methanol, although this is not required to all embodiments. The same illustrative reduction in the amount of carbon-containing feedstock may apply to other carbon-containing feedstocks that are utilized in the feed stream(s).

During startup of the steam reforming fuel processing assembly, hydrogen-producing region 19 may tend to at least initially have a temperature that is substantially lower than the vaporization temperature of the feed stream's components and/or a suitable hydrogen-producing temperature. However, because output stream 20' already will contain some hydrogen gas (and optionally other combustible gases), these gases may provide a byproduct stream 28 having sufficient fuel value for use as a fuel for heating assembly 60 even if hydrogen-producing region 19 is not producing, or not producing more than a minority amount of, hydrogen gas from the portion of feed stream 16 that is delivered thereto. Another potential, but not required, benefit of the production of some hydrogen gas in startup reforming region 130 is that hydrogen gas will tend to produce a more stable flame, such as in a heating assembly 60 that combusts a byproduct or other outlet stream from the fuel processing assembly, than some fuel streams that contain a carbon-containing feedstock. For example, hydrogen gas tends to produce a more stable flame and to have fewer combustion byproducts (and/or more desirable combustion byproducts) than methanol.

Startup assembly 120 may include a startup heating assembly 140 that is adapted to heat vaporization region 122 to a suitable temperature for vaporizing any liquid component of the feed stream and to heat the startup reforming region to a suitable temperature for producing hydrogen gas from the vaporized feed stream. Startup heating assembly 140 may have any suitable construction and may utilize any suitable mechanism for providing the desired heating of the vaporization region and startup reforming region.

Figure 2:
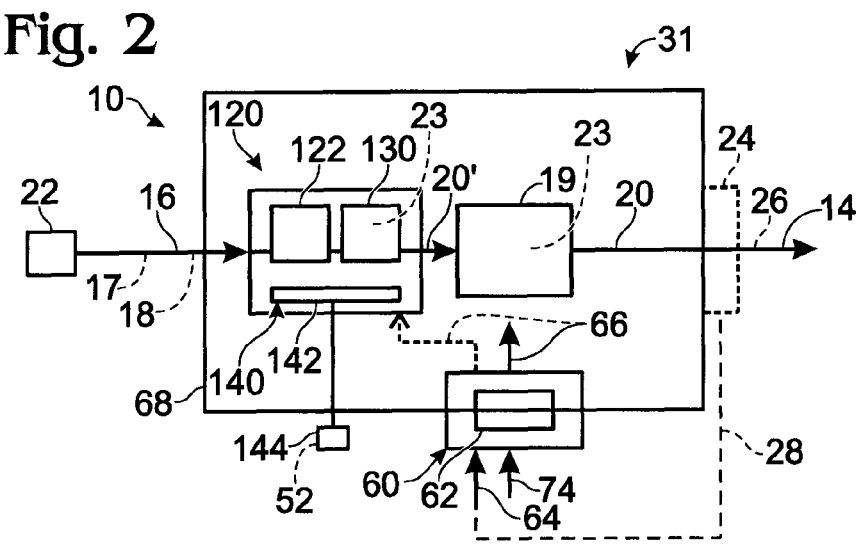
FIG. 2 is a schematic view of another steam reforming hydrogen generation assembly with a startup assembly according to the present disclosure.

In some embodiments, startup heating assembly 140 may include at least one electric heating assembly, such as a cartridge heater or other resistive heating device. However, this is not required to all embodiments. Power for such a device may come from any suitable power source or energy-storage device. Illustrative, non-exclusive examples of suitable power sources include at least one rechargeable or other battery, capacitor (or ultracapacitor or supercapacitor), fly wheel, utility grid, fuel cell system, wind turbine, electric generator, solar generator, hydroelectric power source, and the like. An illustrative, non-exclusive example of a steam reforming hydrogen generation assembly that includes a startup assembly 120 with such an electrically powered startup heating assembly 140 is schematically illustrated in FIG. 2. As shown, startup heating assembly 140 includes an electrically powered heating device 142 and an electrical power source 144 therefor. Power source 142 may include any of the subsequently described energy storage devices 52, but additionally or alternatively may include another electrical power source.

Figure 3:
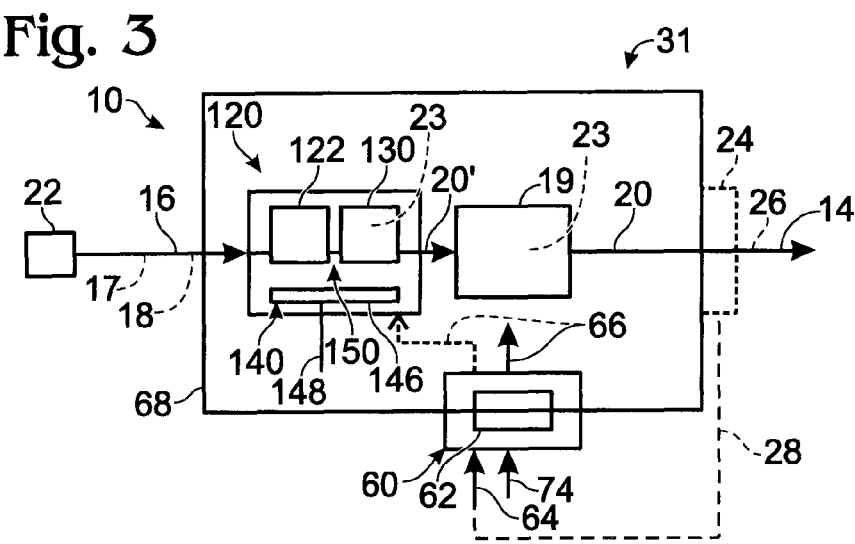
FIG. 3 is a schematic view of another steam reforming hydrogen generation assembly with a startup assembly according to the present disclosure.

In some embodiments, startup heating assembly 140 may include a burner, combustion catalyst, or other suitable combustion source that is adapted to combust a fuel stream in the presence of air to produce a heated exhaust stream that may be used to heat the vaporization region and startup reforming region to the desired temperatures or temperature ranges. An illustrative, non-exclusive example of a steam reforming hydrogen generation assembly that includes a startup assembly 120 with such a startup heating assembly 140 is schematically illustrated in FIG. 3. As shown, startup heating assembly 140 includes a burner or other combustion assembly 146 (such as may, but is not required to, include any of the configurations, constructions, and/or variants discussed herein with respect to heating assembly 60), which is adapted to receive a startup fuel stream 148 and to produce a startup exhaust stream 150 therefrom by combusting the startup fuel stream in the presence of air. Startup fuel stream 148 may include liquid and/or gaseous components. In some embodiments, the startup fuel stream may include carbon-containing feedstock 18. In some embodiments, the startup fuel stream may include carbon-containing feedstock 18 and water 17 from feedstock delivery system 22. In some embodiments, the startup fuel stream may include byproduct stream 28 and/or hydrogen gas from hydrogen-rich stream 26.

In some embodiments, heating assembly 60 may be used to provide heat to the startup assembly, either independently or in combination with startup heating assembly 140. This is schematically illustrated in dashed lines in FIGS. 2 and 3, in which the heated exhaust stream 66 from heating assembly 60 is shown providing heat to at least vaporization region 122 and optionally startup reforming region 130 of the startup assembly. As discussed, illustrative, non-exclusive examples of suitable combustible fuel streams for heating assembly 60 (which may be referred to a primary heating assembly) and/or startup heating assembly 140 include a carbon-containing feedstock (including but not limited to carbon-containing feedstock) 18, feed stream 16, byproduct stream 28, hydrogen gas produced by primary or startup reforming regions 19 and 130, and the like.

Figure 4:
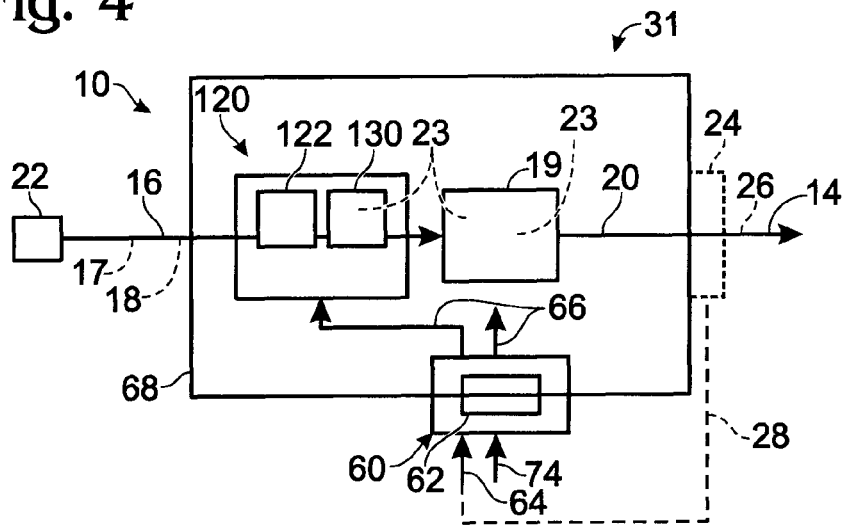
FIG. 4 is a schematic view of another steam reforming hydrogen generation assembly with a startup assembly according to the present disclosure.

It is also within the scope of the present disclosure that startup assembly 120 does not include a startup heating assembly and that it is instead adapted to be heated by heating assembly 60. An illustrative, non-exclusive example of a steam reforming hydrogen generation assembly that includes such a startup assembly 120 is schematically illustrated in FIG. 4. When startup assembly 120 includes a startup heating assembly 122, the startup heating assembly may only be used until vaporization region 122 and/or startup reforming region 130 reach a suitable temperature. After this threshold temperature is reached or exceeded, the startup heating assembly may be turned off or otherwise cease to be used. In some embodiments, it may be desirable to continue to use the startup heating assembly after this threshold temperature has been reached or exceeded.

In some embodiments, the startup assembly and/or the subsequently discussed control system (88) may include a temperature sensor that is adapted to detect when this threshold temperature is reached or exceeded and to control the operation of the startup heating assembly responsive to the detected temperature. Although not required to all embodiments, it is similarly within the scope of the present disclosure that the flow rate of feed stream 16 from, or by, feedstock delivery system 22 may be controlled or otherwise adjusted responsive to such factors as whether the startup heating assembly is still being used, one or more measured temperatures in the startup assembly, hydrogen-producing region 19, or elsewhere within assembly 19, the demand for hydrogen gas by a fuel cell stack, etc.

As discussed, steam reforming hydrogen generation assemblies 10 according to the present disclosure may, but are not required to, include at least one purification region 24. When present in a particular embodiment, it is within the scope of the present disclosure that the purification, or separation, region and hydrogen-producing region 19 may be housed together in a common shell, or housing, 68. It is within the scope of the present disclosure that the separation region is separately positioned relative to hydrogen-producing region 19, such as by being downstream thereof, but in fluid communication therewith to receive the mixed gas, or reformate, stream therefrom. It is also within the scope of the present disclosure that the hydrogen generation assembly does not include a purification region.

Purification region 24 includes any suitable mechanism, device, or combination of devices, that is adapted to reduce the concentration of at least one non-hydrogen component of output stream 20. In other words, the purification region may be adapted to reduce the concentration of at least one of the other gases produced in the hydrogen-producing region or otherwise present in output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced overall hydrogen gas concentration as the output stream. For example, in some applications where product hydrogen stream 14 may be used, certain impurities, or non-hydrogen components, are more harmful than others. As a specific example, in conventional fuel cell systems, carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen gas concentration, but it will reduce the concentration of a non-hydrogen component that is harmful, or potentially harmful, to the desired application for the product hydrogen stream.

Illustrative, non-exclusive examples of suitable devices for purification region 24 include one or more hydrogen-selective membranes 30, chemical carbon monoxide removal assemblies 32 (such as a methanation catalyst bed), and pressure swing adsorption systems 38. It is within the scope of the disclosure that purification region 24 may include more than one type of purification device, and that these devices may have the same or different structures and/or operate by the same or different mechanisms. As discussed herein, hydrogen-producing fuel processing assembly 31 may include at least one restrictive orifice or other flow restrictor downstream of at least one purification region, such as associated with one or more of the product hydrogen stream, hydrogen-rich stream, and/or byproduct stream.

In FIG. 1, purification region 24 is shown within fuel processing assembly 31. It is within the scope of the disclosure that region 24, when present, may alternatively be separately located downstream from the fuel processing assembly, as is schematically illustrated in dash-dot lines in FIG. 1. It is also within the scope of the disclosure that purification region 24 may include portions within an external fuel processing assembly 31.

In FIG. 1, fuel processing assembly 31 is shown including a shell 68 in which at least the hydrogen-producing region, and optionally the purification region, is contained. Shell 68, which also may be referred to as a housing, enables the components of the steam reformer or other fuel processing mechanism to be moved as a unit. It also protects the components of fuel processing assembly 31 from damage by providing a protective enclosure and reduces the heating demand of the fuel processing assembly because the components of the fuel processing assembly may be heated as a unit. Shell 68 may, but does not necessarily, include insulating material 70, such as a solid insulating material, blanket insulating material, and/or an air-filled cavity. It is within the scope of the disclosure, however, that the fuel processing assembly may be formed without a housing or shell. When fuel processing assembly 31 includes insulating material 70, the insulating material may be internal the shell, external the shell, or both. When the insulating material is external a shell containing the above-described reforming and/or purification regions, fuel processing assembly 31 further may include an outer cover or jacket 72 external the insulation, as schematically illustrated in FIG. 1. It is within the scope of the present disclosure that the fuel processing assembly may be implemented with a different shell, with a shell that includes additional components of the fuel processing assembly, including feedstock delivery system 22 (or portions thereof), and/or includes additional components of the fuel cell system. It is also within the scope of the present disclosure that a fuel processing assembly 31 may not include a shell 68.

It is further within the scope of the disclosure that one or more of the components of fuel processing assembly 31 may either extend beyond the shell or be located external at least shell 68. For example, and as discussed, purification region 24 may be located external shell 68, such as with the purification region being coupled directly to the shell or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line representing an alternative shell configuration in FIG. 1.

Figure 5:
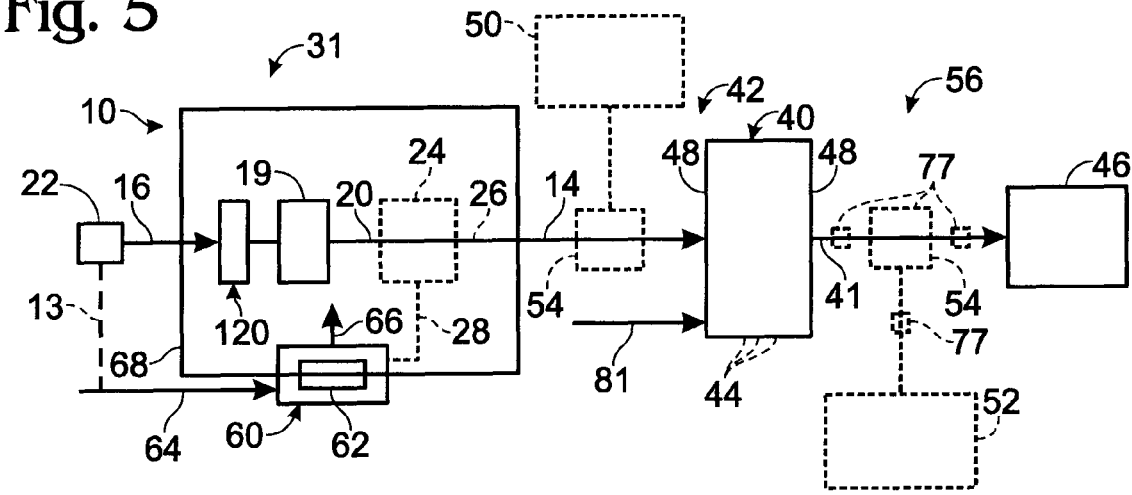
FIG. 5 is a schematic view of a hydrogen-producing fuel cell system according to the present disclosure.

As discussed, product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, hydrogen generation assembly 10 may include or be coupled to at least one fuel cell stack 40, which is adapted to receive at least a portion of product hydrogen stream 14 and an air or other oxidant stream 81 to produce an electrical power output therefrom. This is schematically illustrated in FIG. 5, in which a fuel cell stack is indicated at 40 and produces an electric current, or electrical output, which is schematically illustrated at 41. Air stream 81 may be delivered to the fuel cell stack via any suitable mechanism, including passive or active mechanisms, and powered or manual mechanisms. When coupled to a fuel cell stack 40, the steam reforming hydrogen generation assembly may be referred to as an energy producing system, or a steam reforming fuel cell system, 42. The present application incorporates by reference many different applications that disclose fuel processing assemblies, fuel cell systems, or components thereof. It is within the scope of the present disclosure that these systems and components, including the variations disclosed, illustrated, and incorporated therein and herein may be selectively combined and used or integrated together without departing from the scope of the present disclosure.

Fuel cell stack 40 includes at least one fuel cell 44, and typically includes a plurality of fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

Fuel cell stack 40 may have any suitable construction. Illustrative examples of fuel cell systems, fuel cell stacks, and components thereof, that may be utilized in hydrogen-producing fuel cell systems that include a hydrogen-producing fuel processing assembly according to the present disclosure, are disclosed in U.S. Pat. Nos. 4,214,969, 4,583,583, 5,300,370, 5,484,666, 5,879,826, 6,057,053, and 6,403,249, the complete disclosures of which are hereby incorporated by reference. Additional examples are disclosed in U.S. Patent Application Publication Nos. 2006/0093890 and 2006/0246331, the complete disclosures of which are hereby incorporated by reference.

It is within the scope of the present disclosure that steam reforming hydrogen generation assemblies 10 according to the present disclosure may be used in other applications in which it is desirable to have a source of hydrogen gas and/or may be used to produce hydrogen gas for storage and later consumption. In other words, while hydrogen generation assemblies 10 according to the present disclosure may be utilized with fuel cell stacks to provide a fuel cell system for satisfying an applied electrical load, it is also within the scope of the present disclosure that the hydrogen generation assemblies may be utilized independent of fuel cell stacks.

Energy producing, or fuel cell, system 42 may be adapted to supply power to meet the applied load from at least one energy-consuming device 46. Illustrative examples of energy-consuming devices include, but should not be limited to, motor vehicles, recreational vehicles, construction or industrial vehicles, boats and other sea craft, and any combination of one or more residences, commercial offices or buildings, neighborhoods, tools, lights and lighting assemblies, radios, appliances (including household appliances), computers, industrial equipment, signaling and communications equipment, radios, electrically powered components on boats, recreational vehicles or other vehicles, battery chargers, autonomous battery chargers, mobile devices, mobile tools, emergency response units, life support equipment, monitoring equipment for patients, and even the balance-of-plant electrical requirements for the energy-producing system 42 of which fuel cell stack 40 forms a part. As used herein, energy-consuming device 46 is used to schematically and generally refer to one or more energy-consuming devices that are adapted to draw power from an energy producing system, or fuel cell system, according to the present disclosure. It is also within the scope of the present disclosure that an energy-producing system according to the present disclosure, including such a system that includes a steam reforming hydrogen generation assembly (or hydrogen-producing fuel processing assembly) according to the present disclosure, may be integrated or otherwise coupled to, or commonly housed within, at least one energy-consuming device to provide an energy-producing and consuming assembly, or system, as indicated generally at 56 in FIG. 5.

In the context of a portable energy producing system that includes a steam-reforming hydrogen-producing assembly according to the present disclosure, the rate at which the hydrogen generation assembly is adapted to produce hydrogen gas, and the rated power output of fuel cell stack 40 contribute or otherwise define the number and/or type of energy-consuming devices that system 56 may be adapted to power. Therefore, although not required by all fuel energy producing systems (or hydrogen-producing fuel cell systems), including (but not limited to) smaller, portable energy producing systems according to the present disclosure, the system may be designed or otherwise configured to have a rated/intended maximum power output, and corresponding hydrogen gas production rate, of 1000 watts or less. In some embodiments, the system may be designed or otherwise configured to have a rated/intended maximum power output, and corresponding hydrogen gas production rate, and in some embodiments to have a rated/intended maximum power output of 500 watts or less. In some embodiments, the system may be designed or otherwise configured to have a rated/intended maximum power output, and corresponding hydrogen gas production rate, of 300 watts or less, or even 250 watts. The systems will typically have a rated, or maximum, power output of at least 100 watts, although this is not a requirement of all embodiments. Illustrative, non-exclusive examples of power outputs of 1000 watts or less that may be utilized by systems according to the present disclosure include, but should not be limited to 500-800 watts, 500-750 watts, 750-1000 watts, 200-500 watts, 250-500 watts, 300-600 watts, and 400-800 watts. Illustrative, non-exclusive examples of power outputs of 500 watts or less that may be utilized by systems according to the present disclosure include, but should not be limited to, 25-500 watts, 50-200 watts, 50-250 watts, 150-250 watts, 350-450 watts, 100-400 watts, 100-300 watts, and 250-450 watts. Illustrative, non-exclusive examples of power outputs of 300 watts or less that may be utilized by systems according to the present disclosure include, but should not be limited to, 100-300 watts, 75-300 watts, 100-200 watts, 200-300 watts, 150-300 watts, and 250-300 watts. While not required, these systems may be relatively lightweight and compact, such as being sized for manual transport by an individual.

When fuel cell systems 42 are adapted to have a rated power output of 1 kW or less, such as discussed above, the corresponding hydrogen generation assembly 10 may be configured to provide an appropriate flow rate of hydrogen gas in product hydrogen stream 14 to enable the fuel cell stack, or stacks, to produce this power output. For example, the hydrogen generation assemblies illustrated herein may be adapted to produce less than 20 slm of hydrogen gas when operating at full capacity, with illustrative subsets of this range including less than 15 slm, less than 10 slm, less than 5 slm, 13-15 slm, 3-5 slm, and 2-4 slm of hydrogen gas. For a fuel cell system 42 that is rated to produce 250 watts/hr, an illustrative, non-exclusive example of a suitable capacity for hydrogen generation assembly 10 is 3-4 slm of hydrogen gas.

However, it is within the scope of the present disclosure that steam reforming hydrogen generation assemblies (and energy-producing systems incorporating the same) according to the present disclosure may be constructed to any suitable scale, such as depending upon the desired flow rate of hydrogen gas in product hydrogen stream 14, the desired rated output of the energy producing system, the type and/or number of energy-consuming devices to be powered by the energy producing assembly, limitations on available size for the hydrogen generation assembly and/or the energy production assembly, etc. In some embodiments, it may be desirable to produce energy-production assemblies according to the present disclosure that have a rated (designed) power output of at least 1 kW, such as in the range of 1-2 kW, with the assembly including a hydrogen generation assembly adapted to provide the requisite hydrogen gas to produce the required electricity to satisfy such an applied load. In other applications, it may be desirable for the assembly to have a power output at least 2 kW, such as in the range of 2-4 kW, 3-5 kW, 4-6 kW, or more. For example, such a fuel cell system may be used to provide power to a household or other residence, small office, or other energy-consuming device with similar energy requirements.

It is within the scope of the present disclosure that embodiments of steam reforming hydrogen generation assemblies, fuel processing assemblies, startup assemblies, feedstock delivery systems, fuel cell stacks, and/or fuel cell systems that are disclosed, illustrated and/or incorporated herein may be utilized in combinations of two or more of the corresponding components to increase the capacity thereof. For example, if a particular embodiment of a hydrogen generation assembly is adapted to produce 3-4 slm of hydrogen gas, then two such assemblies may be used to produce 6-8 slm of hydrogen gas. Accordingly, the assemblies and systems disclosed herein may be referred to as scalable systems. It is within the scope of the present disclosure that the hydrogen generation assemblies, fuel processing assemblies, startup assemblies, fuel cell stacks, fuel processing assemblies, and/or heating assemblies described, illustrated and/or incorporated herein may be configured as modular units that may be selectively interconnected.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 5. Device 50 is adapted to store at least a portion of product hydrogen stream 14. For example, when the demand for hydrogen gas by stack 40 is less than the hydrogen output of fuel processing assembly 31, the excess hydrogen gas may be stored in device 50. Illustrative examples of suitable hydrogen storage devices include hydride beds and pressurized tanks. Although not required, a benefit of fuel processing assembly 31 or fuel cell system 42 including a supply of stored hydrogen gas is that this supply may be used to satisfy the hydrogen requirements of stack 40, or the other application for which stream 14 is used, in situations when fuel processing assembly 31 is not able to meet these hydrogen demands. Examples of these situations include when the fuel processing assembly is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processing assembly. Additionally or alternatively, the stored hydrogen gas may also be used as a combustible fuel stream to heat the fuel processing assembly or fuel cell system. Fuel processing assemblies that are not directly associated with a fuel cell stack may still include at least one hydrogen-storage device, thereby enabling the product hydrogen streams from these fuel processing assemblies to also be stored for later use.

Hydrogen generation assemblies 10 and/or fuel cell systems 42 according to the present disclosure may also include a battery or other suitable electricity-storage device 52. Device 52 may additionally or alternatively be referred to as an energy storage device. Device 52 may be adapted to provide a power output to satisfy at least a portion of the balance of plant requirements of assemblies 10 and/or systems 42 (such as to provide power to feedstock delivery system 22 and/or startup heating assembly 140). Device 52 may additionally or alternatively be adapted to satisfy at least a portion of the applied load to fuel cell system 42, such as when the fuel cell stack is not producing an electric current and/or not able to satisfy the applied load. In some embodiments, device 52 may be a rechargeable device that is adapted to store at least a portion of the electric potential, or power output, produced by fuel cell stack 40. Similar to the above discussion regarding excess hydrogen gas, fuel cell stack 40 may produce a power output in excess of that necessary to satisfy the load exerted, or applied, by device 46, including the load required to power fuel cell system 42.

In further similarity to the above discussion of excess hydrogen gas, this excess power output may be used in other applications outside of the fuel cell system and/or stored for later use by the fuel cell system. For example, the battery or other storage device may provide power for use by system 42 during startup or other applications in which the system is not producing electricity and/or hydrogen gas. In FIG. 5, flow-regulating structures are generally indicated at 54 and schematically represent any suitable manifolds, valves, controllers, switches, buses, and the like for selectively delivering hydrogen gas and/or the fuel cell stack's power output to hydrogen-storage device 50 and energy-storage device 52, respectively, and to draw the stored hydrogen gas and stored power output therefrom.

As indicated in dashed lines at 77 in FIG. 5, the fuel cell system may, but is not required to, include at least one power management module 77. Power management module 77 includes any suitable structure for conditioning or otherwise regulating the electrical output produced by the fuel cell system, such as for delivery to energy-consuming device 46. Power management module 77 may include such illustrative structure as buck and/or boost converters, switches, inverters, relays, power filters, and the like.

Figure 6:
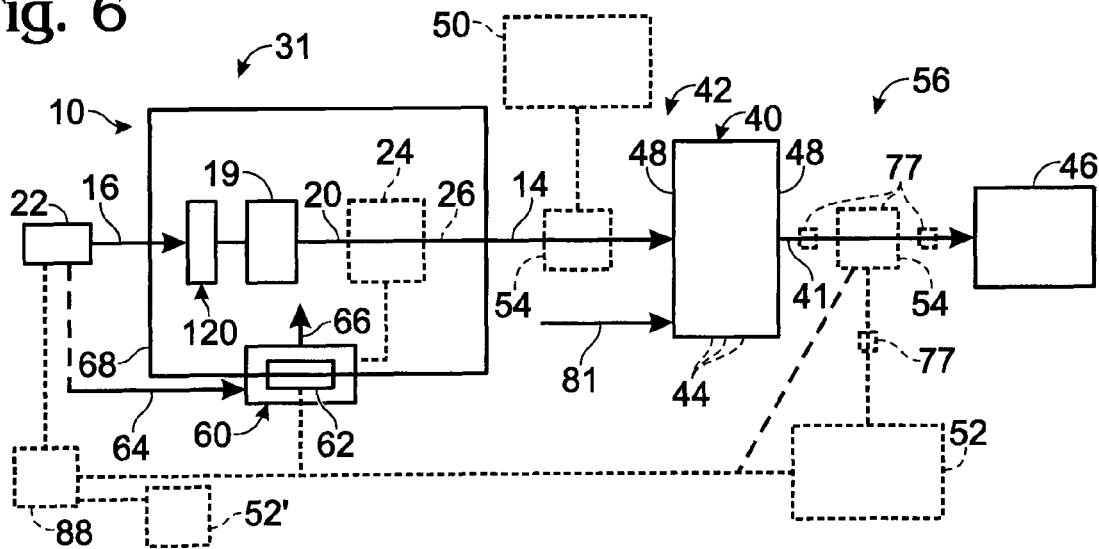
FIG. 6 is a schematic view of another hydrogen-producing fuel cell system according to the present disclosure.
Figure 7:
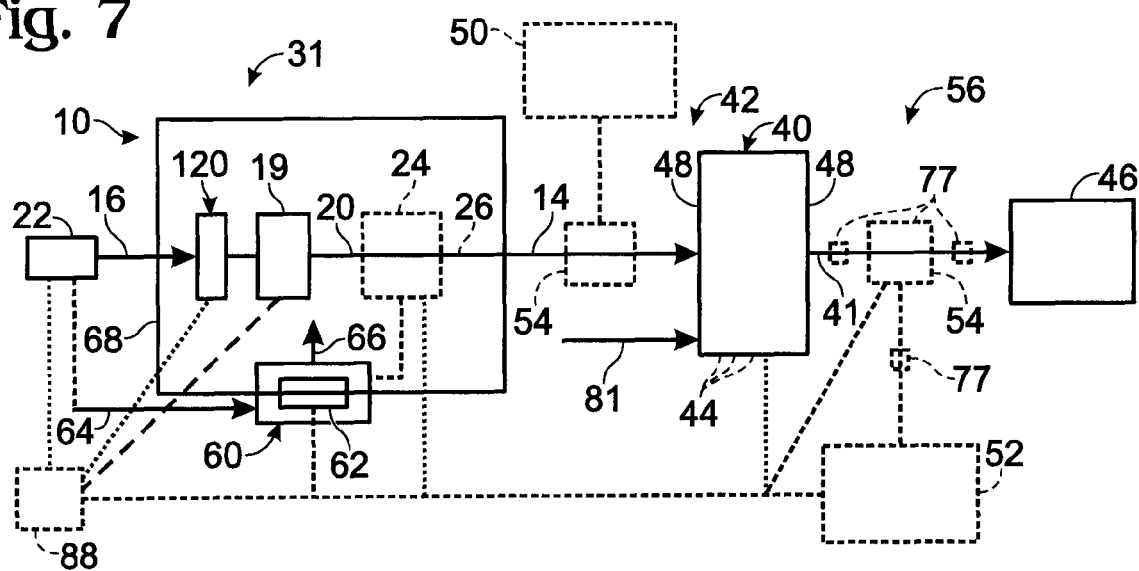
FIG. 7 is a schematic view of another hydrogen-producing fuel cell system according to the present disclosure.

It is within the scope of the present disclosure that steam reforming hydrogen generation assemblies and/or fuel cell systems according to the present disclosure may be free from computerized controllers and control systems. In such an embodiment, the system may be less complex in that it may not include as many sensors, communication linkages, actuators, and the like, and it may have lower balance of plant requirements than a comparable assembly or system that includes a controller. However, in some embodiments, it may be desirable to include a controller, such as to automate one or more operations of the assembly or system, to regulate the operation of the assembly or system, etc. In FIG. 6, an illustrative example of a controller is schematically illustrated at 88 and is shown being in communication with feedstock delivery system 22 and heating assembly 60 of the hydrogen generation assembly. In such a configuration, the controller may be adapted to control and/or regulate at least the startup of the hydrogen generation assembly. Such a controller may additionally or alternatively, control and/or regulate the hydrogen-producing operating state of the assembly. Controller 88 may be powered by any suitable power source, such as a battery or other suitable energy storage device 52. It is also within the scope of the present disclosure that controller 88 is powered by a power source other than battery 52, such as indicated at 52' in FIG. 6. It is also within the scope of the present disclosure that a controller 88 may be in communication with other components of the hydrogen generation assembly and/or fuel cell system, such as to monitor and/or control the operation thereof. Such a controller is schematically illustrated in FIG. 7 and is shown being in communication (via any suitable communication linkage for one or two way communication) with components of the fuel processing assembly (such as hydrogen-producing region 19, purification region 24, and startup assembly 120), feedstock delivery system 22, and fuel cell stack 40.

Fuel processing assemblies 31, heating assemblies 60, startup assemblies 120, and feedstock delivery systems 22 according to the present disclosure may be configured in any of the arrangements described, illustrated and/or incorporated herein. In some embodiments, features or aspects from one or more of the above described configurations may be combined with each other and/or with additional features described herein. For example, it is within the scope of the present disclosure that fuel processing assemblies 10 that include at least one purification region 24 may (but are not required to) house the hydrogen-producing region 19 and at least a portion of the purification region together in a common housing, with this housing optionally being located within the shell 68 of the fuel processing assembly. This is schematically illustrated in FIG. 8, in which reference numeral 25 generally indicates a hydrogen-producing region 19 of a fuel processing assembly, with the hydrogen-producing region being contained within a housing, or vessel, 27 that contains at least the reforming (or other) catalyst 23 used to produce the mixed gas stream from the feed stream that is delivered to the hydrogen-producing region.

Figure 8:
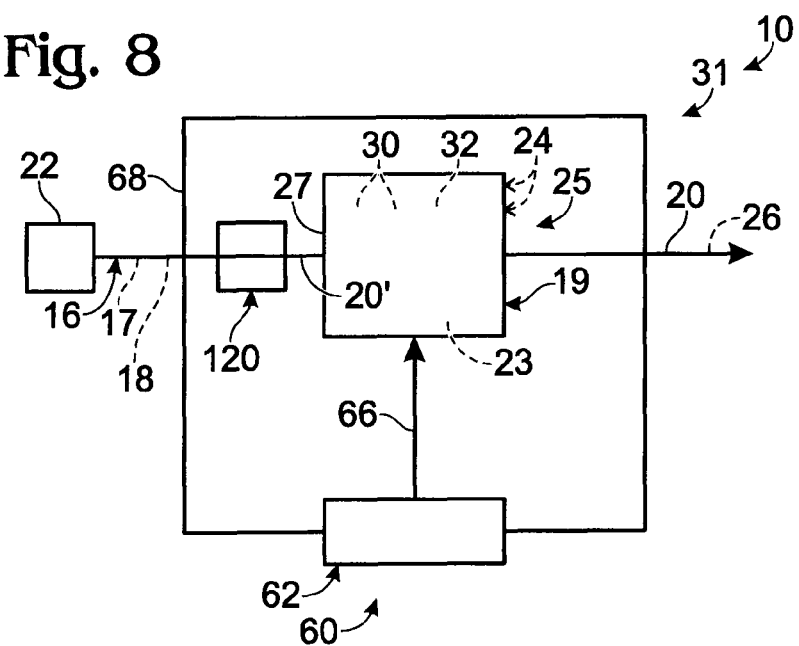
FIG. 8 is a schematic view of another steam reforming hydrogen generation assembly according to the present disclosure.

As indicated in dashed lines in FIG. 8, shell 27 (and thereby region 25) may, but is not required to, also include a purification region 24. For example, as illustrated in dashed lines in FIG. 8, the purification region, when present in the housing, may include one or more hydrogen-selective membranes 30 and/or a chemical carbon monoxide removal assembly 32. Accordingly, region 25 may be described as a hydrogen-producing and purifying region when it contains both a hydrogen-producing region 19 and a purification region 24. It is within the scope of the disclosure that any of the regions 19 and 24 described, illustrated and/or incorporated herein may be used in region 25. When region 25 does not include a purification region, it may simply be described as a hydrogen-producing region 19 that includes a housing 27. When housing 27 includes a purification region 24, it is still within the scope of the present disclosure that the fuel processing assembly may include one or more additional purification regions (such as which may include the same or different purification devices/mechanisms) external (i.e., downstream from) housing 27. The fuel processing assemblies illustrated herein thereby include a hydrogen-producing region that is contained in a housing, with this housing optionally also containing a purification region. As also illustrated in FIG. 8, it is within the scope of the present disclosure that startup assembly 120 may extend partially or completely within housing 27. Additional illustrative, non-exclusive examples of additional regions 25 are disclosed in U.S. Patent Application Publication No. 2006/0090397, the complete disclosure of which is hereby incorporated by reference for all purposes.

As discussed, steam reforming fuel cell systems according to the present disclosure may include a battery or other energy-storage device, a power management module that may include various devices for conditioning or otherwise regulating the electrical output produced by the fuel cell system, and an electrically powered startup heating assembly. In some such embodiments, the power management module may include a boost converter, and the battery or other energy-storage device associated with the power management module may be selectively utilized to provide power to the startup heating assembly. Although this specific embodiment is but one of many embodiments that are within the scope of the present disclosure, it may be selectively utilized to decrease the time required to heat the vaporization region and/or startup reforming region to a selected temperature, such as a suitable vaporization and/or hydrogen-producing temperature. Specifically, the power, or power output, from the battery or other energy storage device may be augmented by the boost converter, such as through the use of suitable relays, to increase the voltage of the power output provided to the startup heating.

In FIGS. 9-14, various illustrative, non-exclusive examples of startup assemblies 120 and hydrogen-producing fuel processing assemblies 31 according to the present disclosure are illustrated. The depicted examples are intended for the purpose of illustration, and not limitation, in that many other embodiments are within the scope of the present disclosure, such as described, illustrated, and/or incorporated elsewhere herein. It is within the scope of the present disclosure that the illustrated examples of FIGS. 9-14, including components thereof, may (but are not required to) be selectively utilized in any of the steam reforming fuel processing assemblies and steam reforming fuel cell systems that are described, illustrated, and/or incorporated herein.

In various ones of FIGS. 9-14, startup assembly 120 includes a vaporization region, or vaporizer, 122 that is housed in a common shell, or housing, as startup reforming region 130 and reforming catalyst 23. In the illustrated embodiments, the vaporization region includes a region, or bed, 162 of vaporization material 164, through which feed stream 16 flows. Region 162 and material 164 are graphically indicated in at least FIG. 10, as is an optional gas-permeable retainer 165 that is downstream of the catalyst. An illustrative, non-exclusive example of vaporization material is stainless steel shot, although it is within the scope of the present disclosure that vaporization region 122 and/or vaporization material 164 may utilize other materials and/or constructions.

When present, vaporization bed 162 and/or vaporization material 164 should be located sufficiently upstream from startup reforming region 130 to vaporize liquid components of the feed stream prior to the feed stream flowing to the startup reforming region. In the illustrated, non-exclusive examples, the vaporization region and startup reforming region are contained in a common housing. However, it is also within the scope of the present disclosure that these regions are spaced apart from each other in separate housings. It is also within the scope of the present disclosure that the startup assembly and the primary steam reforming region are heated by the same heating assembly, and therefore that the startup assembly does not include a separate heating assembly that is used (exclusively, or predominantly) only during startup of the fuel processing assembly.

Figure 13:
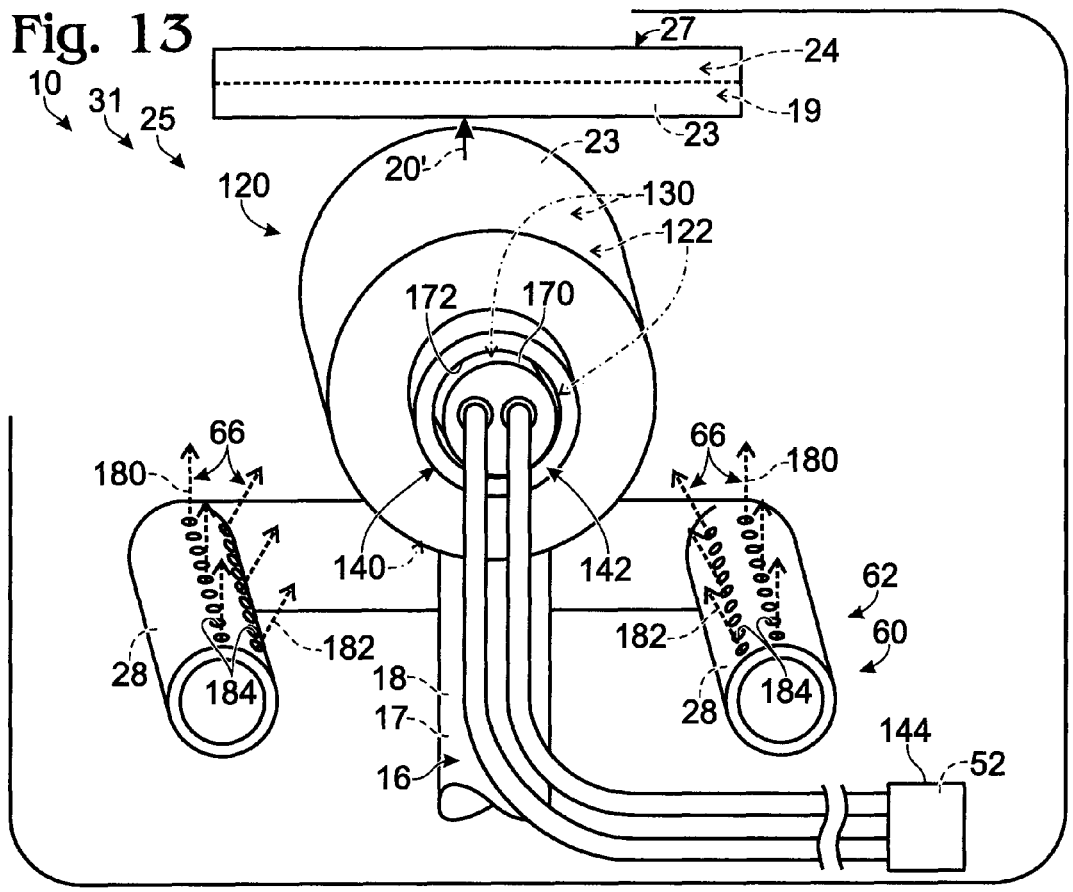
FIG. 13 is an end elevation view of the another illustrative startup assembly according to the present disclosure and a portion of a fuel processing assembly for use therewith.

In the illustrated examples of FIGS. 9-13, and as indicated in at least FIGS. 10 and 13, startup heating assembly 140 includes an electrically powered heating assembly 142 in the form of a cartridge heater 170 that is inserted into a bore, thermowell, or other passage 172 in the housing containing vaporization region 122 and startup reforming region 130. As discussed, the power source 144 for the electrically powered heating assembly may, but is not required to, include or be a battery or other energy storage device 52, such as which may be adapted to store a portion of the electrical output produced by a fuel cell stack associated with the hydrogen generation assembly. As illustrated, the bore extends through the vaporization region and the catalyst-containing startup reforming region, although this construction is not required to all embodiments. For example, in some embodiments, the startup assembly may additionally or alternatively include an electrically powered heating assembly that is positioned around and/or otherwise external to the startup reforming region and/or vaporization region.

In various ones of FIGS. 9-14, steam reforming hydrogen-producing region 19 is illustrated generally at 27 as being contained within a common housing, or vessel, 27 as at least one purification region 24. In these illustrated, non-exclusive examples, purification region 24 includes at least one hydrogen-selective membrane 30. It is within the scope of the present disclosure that purification region 24, when present in a particular embodiment, may include a different construction in addition to or in place of one or more membranes 30. Also shown in various ones of FIGS. 9-14 is a heating assembly 60 in the form of a burner 62 that is adapted to produce a heated exhaust stream by combusting a gaseous fuel stream (such as byproduct stream 28) in the presence of air. The illustrated construction and configuration for burner 62 is but one of many possibilities, as discussed herein.

In FIG. 9, startup assembly 120 is shown positioned beneath a shell 27 that contains a hydrogen-producing region 19 and which may additionally or alternatively contain at least one purification region 24. In dashed lines, shell 27 is shown including purification region 24 in the form of at least one hydrogen-selective membrane 30 and a chemical carbon monoxide removal assembly, such as a methanation catalyst region, or bed. As discussed, either or both of these purification regions, if present in a particular embodiment, may be located downstream and spaced-apart from shell 27. In use, one or more feed streams 16, such as may include water 17 and a carbon-containing feedstock 18 are delivered to the startup assembly. Liquid components of the feed stream(s) are vaporized in vaporization region 122, and at least a portion of the carbon-containing feedstock is reacted to form hydrogen gas in startup reforming region 130, which contains a reforming catalyst 23. In some embodiments, at least a majority of the carbon-containing feedstock will be reacted to form gaseous reaction products, including hydrogen gas. In some embodiments, all or nearly all of the carbon-containing feedstock will be reacted to form gaseous reaction products, including hydrogen gas. In some embodiments, at least the carbon-containing portion of the hydrogen-containing output stream 20' from the startup assembly is gaseous and will not condense to form a liquid at the temperatures and pressures encountered by stream 20' in the fuel processing assembly. In some embodiments, at least the carbon-containing portion of stream 20' will remain gaseous even if cooled to ambient temperatures and pressures of 25° C. and 1 atm.

The hydrogen-containing output stream 20' from the startup assembly then flows as a reactant stream to hydrogen-producing region 19. As discussed, region 19 is downstream from the startup assembly and may be described as containing a second steam reforming region that is downstream from the startup reforming region. The reformate, or mixed gas, stream 20 produced in hydrogen-producing region 19 is then separated into at least one product stream, such as may take the form of hydrogen-rich stream 26 and/or product hydrogen stream 14, and at least one byproduct stream 28. Byproduct stream 28 may form at least a portion, if not all, of a combustible (gaseous) fuel stream for a heating assembly 60, which is configured to combust the fuel stream in the presence of air to produce heated exhaust stream 66. Heating assembly 60, which may take the form of a burner 62, is positioned to emit heated exhaust stream 66 so that this stream may provide heat to the startup assembly and to hydrogen-producing region 19. In some embodiments, the only combustible fuel stream received by heating assembly 60 is byproduct stream 28, while in others the heating assembly is adapted to receive a combustible fuel stream in addition to, or in place of, byproduct stream 28.

The relative position of startup assembly 120 relative to shell 27 (and/or hydrogen-producing region 19) is not critical. For example, in FIG. 9, the startup assembly extends closely adjacent the shell 27, whereas in FIG. 10, the startup assembly is spaced-apart from shell 27 by a greater distance. In some embodiments, the relative shape, size, and/or position of the startup assembly, and the hydrogen-producing region may be utilized to control the relative temperatures thereof responsive to heat that is applied thereto, such as by heating assembly 60 and/or startup heating assembly 140. In some embodiments, the position, size, and/or configuration of heating assembly 60 and/or startup heating assembly 140 may additionally or alternatively define the relative temperatures of startup reforming region 130 and hydrogen-producing region 19. In FIG. 11, an illustrative, non-exclusive example of a suitable configuration for a heating assembly 60 that is adapted to heat startup assembly 120 and hydrogen-producing region 19 with the heated exhaust stream is shown. As illustrated in this non-exclusive example, the heating assembly takes the form of a burner 62 that includes apertures that are spaced-apart to provide heated exhaust streams that are directed toward hydrogen-producing region 19 and which collectively extend on opposed sides of startup assembly 120.

FIG. 12 illustrates an example of a startup assembly that provides a gaseous, hydrogen-containing output stream 20' that is delivered directly to a purification region 24 instead of a to a downstream hydrogen-producing region 19. FIG. 12 also provides a graphical example of a startup assembly that forms a portion of shell 27, which as shown, contains at least one purification region 24. As indicated in dash-dot lines, it is within the scope of the present disclosure for such an embodiment to also include a hydrogen-producing region 19 with a steam reforming catalyst 23.

As discussed, in some embodiments, heating assembly 60, which may take the form of a burner 62, may be configured to distribute the heated combustion stream 66 between startup assembly 120 and hydrogen-producing region 19. An illustrative, non-exclusive example of such a construction is shown in FIG. 13, in which heated exhaust stream 66 is schematically illustrated being directed along a first flow path 180 toward vessel 27 and a second flow path 182 toward startup assembly 120. A potential benefit of such a construction is that the heat provided by the heated exhaust stream is divided according to a predetermined relationship between shell 27 (and/or other suitable housing for steam reforming hydrogen producing region 19) and startup assembly 120. In at least FIG. 13, burner 62 includes gas (fuel) distribution holes, or apertures, 184, which may be formed by any suitable mechanism, such as laser drilling. However, this construction is not required to all embodiments.

Figure 14:
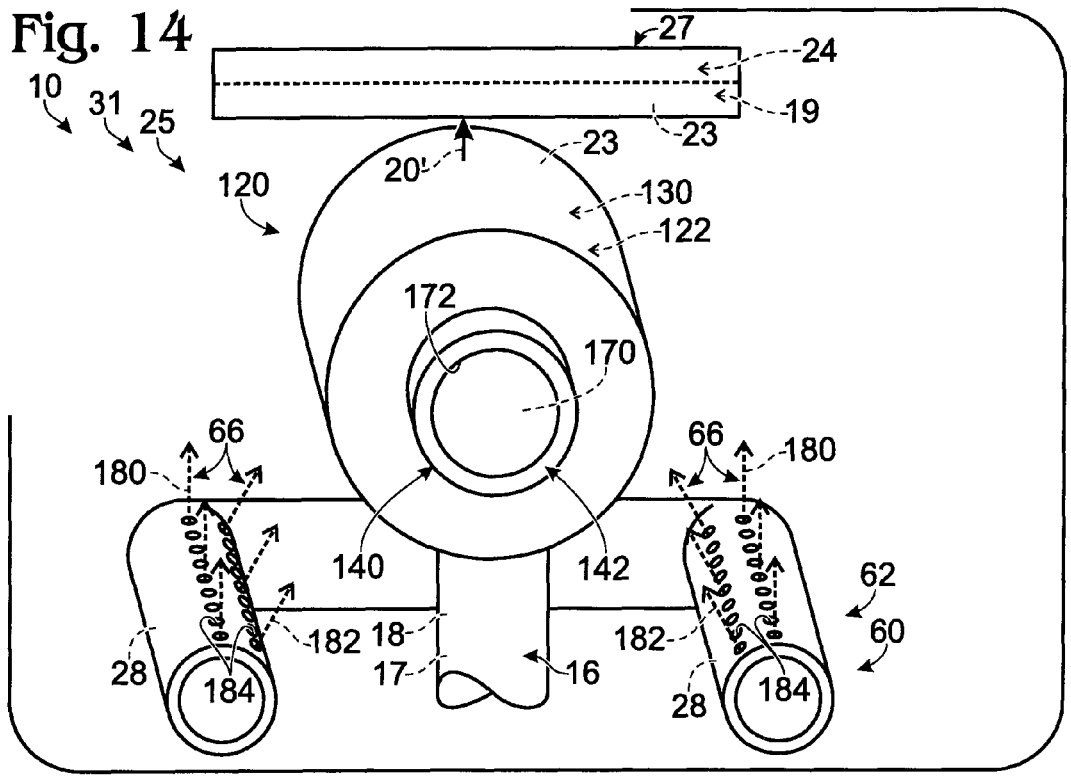
FIG. 14 is an end elevation view of the another illustrative startup assembly according to the present disclosure and a portion of a fuel processing assembly for use therewith.

In dash-dot lines in FIG. 13, the relative position of startup heating assembly 140 is reversed with respect to startup reforming region 130 and vaporization region 122 to schematically provide a graphical example of a startup assembly in which the startup heating assembly does not extend in a bore or thermowell in the startup reforming region and/or vaporization region. In such an embodiment, startup heating assembly 140 may still take the form of an electrically powered heating assembly, although this is not required. To illustrate this point, FIG. 14 provides an illustrative, non-exclusive example of a startup assembly that does not include an electrically powered heating assembly. Instead, FIG. 14 illustrates that heating assembly 60 may be used to heat the startup assembly and hydrogen-producing region 19, although it is also within the scope of the present disclosure that the startup assembly may include a combustion-based heating assembly that is not the same as heating assembly 60. In the illustrated example, startup assembly may still include a bore 172, such as to provide a passage, or conduit, through which the heated exhaust stream from heating assembly 60 may flow to heat the vaporization region and/or startup reforming region. As another illustrative example, the startup reforming region and/or vaporization region may be comparatively smaller in cross-sectional area in view of the omission of a cartridge heater and corresponding bore therefore. In a further example, the region previously occupied by the bore may instead be formed from a body 174 of thermally conductive material that, once heated, assists in maintaining the startup assembly at or above defined minimum temperatures.

INDUSTRIAL APPLICABILITY

The hydrogen-producing fuel processing systems disclosed herein are applicable to the hydrogen-generation and energy-production industries.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A method for starting up a hydrogen generation assembly that includes a startup assembly and a hydrogen-producing region and produces hydrogen gas via a steam reforming reaction, the method comprising:
   heating the startup assembly, which includes a vaporization region and a startup reforming region, to a suitable hydrogen-producing temperature during a startup period in which a temperature of the hydrogen-producing region is less than the hydrogen-producing temperature;
   delivering a liquid feed stream that contains water and a carbon-containing feedstock to the startup assembly;
   vaporizing the liquid feed stream in the startup assembly;
   chemically reacting at least a portion of the liquid feed stream in the startup assembly to produce a gas-phase stream that contains hydrogen gas and has a different composition than the liquid feed stream;
   withdrawing at least a portion of the gas-phase stream from the startup assembly as an output stream;
   delivering the output stream to the hydrogen-producing region, which includes a steam reforming catalyst, during the startup period;
   withdrawing a discharge stream from the hydrogen-producing region; wherein the discharge stream contains hydrogen gas and other gases;
   delivering the discharge stream to a separation assembly that is configured to separate the discharge stream into a hydrogen-rich stream, which contains a greater concentration of hydrogen gas than the discharge stream, and a byproduct stream, which contains a greater concentration of the other gases than the discharge stream; and
   combusting the byproduct stream to produce a heated exhaust stream for heating the startup assembly and the hydrogen-producing region.

2. The method of claim 1, wherein the heating includes electrically heating the startup assembly.

3. The method of claim 1, wherein the output stream does not contain any of the carbon-containing feedstock.

4. The method of claim 1, wherein the output stream includes all of the gas-phase stream.

5. The method of claim 1, wherein the method further comprises producing an electrical output from a portion of the hydrogen-rich stream.

6. The method of claim 1, wherein the hydrogen-producing region and the startup reforming region contain different amounts of steam reforming catalyst.

7. The method of claim 1, wherein the hydrogen-producing region and the startup reforming region contain the same amount of steam reforming catalyst.

8. The method of claim 1, wherein the method further comprises chemically reacting at least a portion of any carbon monoxide in the hydrogen-rich stream.

9. The method of claim 1, wherein heating the startup assembly includes heating the startup assembly with a startup heater, wherein combusting the byproduct stream includes combusting the byproduct stream with a combustion heater, and further wherein the method includes ceasing heating the startup assembly with the startup heater subsequent to the startup reforming region reaching the suitable hydrogen-producing temperature.

10. The method of claim 1, wherein the method further includes initiating heating the startup assembly responsive to a demand for hydrogen gas.

11. The method of claim 1, wherein delivering the liquid feed stream to the startup assembly includes delivering the liquid feed stream responsive to a temperature of the hydrogen generation assembly.

12. The method of claim 1, wherein delivering the liquid feed stream to the startup assembly includes delivering the liquid feed stream responsive to a temperature of the startup assembly.

13. The method of claim 1, wherein the composition of the discharge stream is substantially similar to the composition of the output stream.

14. The method of claim 1, wherein the output stream remains in the gaseous state at a temperature that is below the hydrogen-producing temperature.

15. The method of claim 1, wherein the output stream remains in the gaseous state at a temperature of 25° C. and a pressure of 1 atm.

16. The method of claim 1, wherein chemically reacting at least a portion of the liquid feed stream includes chemically reacting at least a substantial portion of the liquid feed stream.

17. The method of claim 16, wherein chemically reacting at least a substantial portion of the liquid feed stream includes chemically reacting all of the liquid feed stream.

18. The method of claim 1, wherein the separation assembly includes a pressure swing adsorption assembly.

19. The method of claim 1, wherein the separation assembly includes a hydrogen-selective membrane.

20. The method of claim 1, wherein, during the startup period, the hydrogen-producing region is not producing any hydrogen gas from the output stream delivered thereto.

21. The method of claim 1, wherein the startup assembly includes a first housing containing the vaporization region and the startup reforming region.

22. The method of claim 21, wherein the hydrogen-producing region is contained in a second housing that is separate from the first housing.

23. The method of claim 1, wherein, during the startup period, a fuel value of the byproduct stream that is combusted to form the heated exhaust stream is sufficient to heat the hydrogen-producing region to the hydrogen-producing temperature.

24. The method of claim 23, wherein the method further includes combusting only the byproduct stream to produce the heated exhaust stream for heating the startup assembly and the hydrogen-producing region.

* * * * *